(12) United States Patent
Yavuz et al.

(10) Patent No.: US 6,274,107 B1
(45) Date of Patent: *Aug. 14, 2001

(54) ZEOLITE-CONTAINING OXIDATION CATALYST AND METHOD OF USE

(75) Inventors: Bulent O. Yavuz, Plainfield; Kenneth E. Voss, Somerville; Michel Deeba, North Brunswick; John R. Adomaitis, Old Bridge; Robert J. Farrauto, Westfield, all of NJ (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/458,052

(22) Filed: Jun. 1, 1995

Related U.S. Application Data

(62) Division of application No. 08/255,289, filed on Jun. 7, 1994, which is a continuation of application No. 08/038,378, filed on Mar. 29, 1993, which is a continuation-in-part of application No. 07/973,461, filed on Nov. 19, 1992.

(51) Int. Cl.[7] ....................................................... B01J 8/02
(52) U.S. Cl. ..................... 423/213.5; 423/213.2; 423/244.11
(58) Field of Search ........................... 423/213.2, 244.11, 423/ 213.5; 502/65

(56) References Cited

U.S. PATENT DOCUMENTS

| | | |
|---|---|---|
| 3,161,605 | 12/1964 | Beck et al. ............................ 252/455 |
| 3,331,190 | 7/1967 | Glew et al. .............................. 55/63 |
| 3,864,452 | 2/1975 | Chi et al. .............................. 423/244 |
| 3,993,572 | 11/1976 | Hindin et al. ......................... 252/462 |
| 4,053,556 | 10/1977 | Acres ..................................... 423/239 |
| 4,123,391 | 10/1978 | Noguchi et al. ................ 252/466 PT |
| 4,134,860 | 1/1979 | Hindin et al. ......................... 252/466 |
| 4,171,288 | 10/1979 | Keith et al. ........................... 252/462 |
| 4,171,289 | 10/1979 | Wheelock ...................... 252/466 PT |
| 4,189,404 | 2/1980 | Keith et al. ........................... 252/462 |
| 4,200,552 | 4/1980 | Noguchi et al. ................ 252/466 PT |
| 4,297,328 | 10/1981 | Ritscher et al. .................... 423/213.2 |
| 4,407,785 | 10/1983 | Pfefferle ............................... 423/245 |
| 4,418,046 | 11/1983 | Izumo et al. ......................... 423/245 |
| 4,477,417 | 10/1984 | Domesle et al. ................... 423/213.2 |

(List continued on next page.)

FOREIGN PATENT DOCUMENTS

| | | |
|---|---|---|
| 6769990 | 12/1990 | (AU) . |
| 1 467 174 | 1/1973 | (DE) . |
| 3340682 | 5/1985 | (DE) . |
| 38 05 734 A1 | 8/1989 | (DE) . |
| 4039952 | 6/1992 | (DE) . |
| 42 26 111 A1 | 2/1994 | (DE) . |
| 42 26 112 A1 | 2/1994 | (DE) . |
| 211233 | 2/1987 | (EP) . |

(List continued on next page.)

OTHER PUBLICATIONS

J.S. Feeley et al, "Abatement of $NO_x$ from Diesel Engines: Status and Technical Challenges", SAE Technical Paper Series, No. 950747, Feb. 1995.

B.H. Engler et al, "Reduction of Exhaust Gas Emissions by Using Hydrocarbon Adsorber Systems", SAE Technical Paper Series, No. 930738, Mar. 1993.

S. Kagawa et al, "Cocation Effect in Catalytic Property of Copper Ion–Exchanged ZSM–5 Zeolites for the Direct Decomposition of Nitrogen Monoxide", Chemistry Letters, pp. 407–410, 1991.

D.W. Breck, "Zeolite Molecular Sieves, Structure, Chemistry and Use", J. Wiley & Sons, New York, 1974, pp. 305, 309 and 348.

P.A. Jacobs and J.A. Martens, "Synthesis of High–Silica Aluminosilicate Zeolites", Studies in Surface Science and Catalysis, vol. 33, Ed. B. Delmon and J.T. Yates, Elsevier, Amsterdam–Oxford–New York–Tokyo, 1987, Table of Contents pp. V–IX.

M. Iwamoto, "Decomposition of Nitrogen Oxides by Contact Reaction", Petrotech 12(11), pp. 888–892, (1989).

M. Iwamoto, "$NO_x$ Reduction Characteristics of PT–ZSM–5 Catalyst With Diesel Engine Exhaust", JSAE (Japan) Review, 16, pp. 21–25, (1995).

(List continued on next page.)

Primary Examiner—Steven P. Griffin
Assistant Examiner—Christina Ildebrando
(74) Attorney, Agent, or Firm—Richard A. Negin

(57) ABSTRACT

Oxidation catalyst compositions for treating diesel exhaust include ceria and, optionally, alumina, each having a surface area of at least about 10 $m^2/g$, and a zeolite, e.g., Beta zeolite. Optionally, platinum may be included in the catalytic material, preferably in amounts which are sufficient to promote some gas-phase oxidation of carbon monoxide ("CO") and hydrocarbons ("HC") but which are limited to preclude excessive oxidation of $SO_2$ to $SO_3$. Alternatively, palladium in any desired amount may be included in the catalytic material. The zeolite is optionally doped, e.g., ion-exchanged, with one or more of hydrogen, a platinum group metal or other catalytic metals. The catalyst compositions may be used in a method to treat diesel engine exhaust by contacting the hot exhaust with the catalyst composition to promote the oxidation of gas-phase CO and HC and of the volatile organic fraction component of particulates in the exhaust.

28 Claims, 10 Drawing Sheets

U.S. PATENT DOCUMENTS

| | | | |
|---|---|---|---|
| 4,492,769 | 1/1985 | Blanchard et al. | 502/262 |
| 4,529,828 | 7/1985 | Antos et al. | 585/828 |
| 4,568,655 | 2/1986 | Oleck et al. | 502/66 |
| 4,581,343 | 4/1986 | Blanchard et al. | 502/241 |
| 4,613,583 | 9/1986 | Koch et al. | 502/252 |
| 4,621,071 | 11/1986 | Blanchard et al. | 502/302 |
| 4,624,940 | 11/1986 | Wan et al. | 502/251 |
| 4,683,214 | 7/1987 | Angevine et al. | 502/66 |
| 4,707,341 | 11/1987 | Koch et al. | 422/171 |
| 4,711,864 | 12/1987 | Pellet et al. | 502/65 |
| 4,714,694 | 12/1987 | Wan et al. | 502/304 |
| 4,727,052 | 2/1988 | Wan et al. | 502/327 |
| 4,749,671 | 6/1988 | Saito et al. | 502/64 |
| 4,757,045 | 7/1988 | Turner et al. | 502/252 |
| 4,759,918 | 7/1988 | Homeier et al. | 423/213.5 |
| 4,760,044 | 7/1988 | Joy, III et al. | 502/303 |
| 4,782,038 | 11/1988 | Gandhi et al. | 502/304 |
| 4,849,399 | 7/1989 | Joy, III et al. | 502/333 |
| 4,857,088 | 8/1989 | Mizrah et al. | 55/523 |
| 4,872,038 | 10/1989 | Gandhi et al. | 502/304 |
| 4,923,835 | 5/1990 | Travers et al. | 502/66 |
| 4,929,581 | 5/1990 | Steinwandel et al. | 502/2 |
| 4,934,142 | 6/1990 | Hayashi et al. | 60/297 |
| 4,944,273 | 7/1990 | Baresel et al. | |
| 4,961,917 | 10/1990 | Byrne | 423/239 |
| 4,962,075 | 10/1990 | Green et al. | 502/71 |
| 4,973,399 | 11/1990 | Green et al. | 208/120 |
| 4,996,180 | 2/1991 | Diwell et al. | 502/304 |
| 5,000,929 | 3/1991 | Horiuchi et al. | 423/213.5 |
| 5,002,742 | 3/1991 | Lussier et al. | 423/244 |
| 5,008,090 | 4/1991 | Joy, III et al. | 423/212 |
| 5,017,538 | 5/1991 | Takeshima | 502/64 |
| 5,024,981 | 6/1991 | Speronello et al. | 502/61 |
| 5,051,244 | 9/1991 | Dunne et al. | 423/212 |
| 5,059,575 | 10/1991 | Jorgensen et al. | 502/304 |
| 5,071,816 | 12/1991 | Horiuchi et al. | 502/302 |
| 5,078,979 | 1/1992 | Dunne | 423/212 |
| 5,081,095 | 1/1992 | Bedford et al. | 502/304 |
| 5,102,838 | 4/1992 | Beck et al. | 502/60 |
| 5,106,802 | 4/1992 | Horiuchi et al. | 502/65 |
| 5,125,231 | 6/1992 | Patil et al. | 60/274 |
| 5,145,825 | 9/1992 | Deeba et al. | 502/242 |
| 5,155,077 | 10/1992 | Montreuil et al. | 502/66 |
| 5,157,007 | 10/1992 | Domesle et al. | 502/66 |
| 5,164,350 | 11/1992 | Abe et al. | 502/66 |
| 5,206,196 | 4/1993 | Nakano et al. | 502/73 |
| 5,234,876 | 8/1993 | Swaroop et al. | 502/79 |
| 5,236,879 | 8/1993 | Inoue et al. | 502/73 |
| 5,244,852 | 9/1993 | Lachman et al. | 502/66 |
| 5,248,643 | 9/1993 | Patil et al. | 502/67 |
| 5,284,638 | 2/1994 | Hertl et al. | 423/245.1 |
| 5,292,991 | 3/1994 | Lachman et al. | 585/850 |
| 5,296,198 | 3/1994 | Abe et al. | 422/180 |
| 5,330,945 | 7/1994 | Beckmeyer et al. | 502/66 |
| 5,365,011 | 11/1994 | Ramachandran et al. | 585/829 |
| 5,491,120 | * 2/1996 | Voss et al. | 502/304 |
| 5,504,052 | 4/1996 | Rizkalla et al. | 502/347 |
| 5,538,697 | 7/1996 | Abe et al. | 422/171 |
| 5,538,698 | 7/1996 | Abe et al. | 422/174 |
| 5,602,070 | 2/1997 | Rizkalla | 502/347 |
| 5,772,972 | 6/1998 | Hepburn et al. | 423/213.5 |

FOREIGN PATENT DOCUMENTS

| | | | |
|---|---|---|---|
| 251703 | 1/1988 | (EP) | |
| 321949 | 6/1989 | (EP) | |
| 377290 | 7/1990 | (EP) | |
| 382434 | 8/1990 | (EP) | |
| 397411 | 11/1990 | (EP) | |
| 399891 | 11/1990 | (EP) | |
| 404385 | 12/1990 | (EP) | |
| 0404385 | * 12/1990 | (EP) | |
| 449423 | 10/1991 | (EP) | |
| 459396 | 12/1991 | (EP) | |
| 462593 | 12/1991 | (EP) | |
| 92102161 | 3/1992 | (EP) | |
| 0 485 179 A2 | 5/1992 | (EP) | |
| 0 488 250 A1 | 6/1992 | (EP) | B01D/53/36 |
| 0 491 360 A1 | 6/1992 | (EP) | |
| 0499931 | * 8/1992 | (EP) | |
| 499931 | 8/1992 | (EP) | |
| 503500 | 9/1992 | (EP) | |
| 0508513 | * 10/1992 | (EP) | |
| 508513 | 10/1992 | (EP) | |
| 559021 | 9/1993 | (EP) | |
| 0 369 576 B1 | 6/1994 | (EP) | B01J/29/06 |
| 0 485 179 B1 | 5/1995 | (EP) | F01N/3/20 |
| 0 691 459 A1 | 1/1996 | (EP) | |
| 0 638 710 B1 | 8/1997 | (EP) | F01N/3/20 |
| 2546770 | 12/1984 | (FR) | |
| 1060424 | 3/1967 | (GB) | |
| 1071373 | 6/1967 | (GB) | |
| 1551348 | 12/1976 | (GB) | |
| 2084891 | 4/1982 | (GB) | |
| 2122912 | 1/1984 | (GB) | |
| 2236493 | 4/1991 | (GB) | |
| 56-2920 | 1/1981 | (JP) | |
| 56-5419 | 1/1981 | (JP) | |
| 142851 | 8/1984 | (JP) | |
| 60-147240 | 8/1985 | (JP) | |
| 2187111 | 8/1987 | (JP) | |
| 1-139144 | 5/1989 | (JP) | |
| 1-155611 | 6/1989 | (JP) | |
| 2-126936 | 5/1990 | (JP) | |
| 2251247 | 10/1990 | (JP) | B01J/29/24 |
| 3270732 | 12/1991 | (JP) | |
| 5-317701 | 12/1993 | (JP) | |
| 6-126165 | 5/1994 | (JP) | |
| 6-210163 | 8/1994 | (JP) | |
| 6-210164 | 8/1994 | (JP) | |
| 6-312132 | 11/1994 | (JP) | |
| 7-102957 | 4/1995 | (JP) | |
| 7-88364 | 4/1995 | (JP) | |
| 7-96178 | 4/1995 | (JP) | |
| 7-155613 | 6/1995 | (JP) | |
| 7-185326 | 7/1995 | (JP) | |
| 8-10566 | 1/1996 | (JP) | |
| 8-10613 | 1/1996 | (JP) | |
| 8-99033 | 4/1996 | (JP) | |
| WO90/00441 | 1/1990 | (WO) | |
| WO 94/01926 | 1/1994 | (WO) | |
| WO 94/11623 | 5/1994 | (WO) | F01N/3/28 |
| WO 94/22564 | 10/1994 | (WO) | |
| WO 96/15992 | 5/1996 | (WO) | |
| WO 96/39676 | 12/1996 | (WO) | |
| WO 96/40419 | 12/1996 | (WO) | |
| WO 97/00119 | 1/1997 | (WO) | |

OTHER PUBLICATIONS

Burch et al, "An Investigation of the Mechanism of the Selective Catalytic Reduction of NO on Various Metal/ZSM–5 Catalysts: Reaction of H2/NO Mixtures"; Catalysis Letters 27 (1994), pp. 177–186.

The Effects of Flow–Through Type Oxidation Catalysts on the Particulate Reduction of 1990's Diesel Engines, M. Horiuchi et al, SAE Paper 900600, Feb. 1990.

* cited by examiner

//. # ZEOLITE-CONTAINING OXIDATION CATALYST AND METHOD OF USE

CROSS-REFERENCE TO RELATED APPLICATION

This application is a divisional of copending application Ser. No. 08/255,289 filed Jun. 7, 1994, which is a continuation of 08/038,378 filed Mar. 29, 1993, which is a continuation-in-part of application Ser. No. 07/973,461, filed Nov. 19, 1992.

BACKGROUND OF THE INVENTION

1. Field of the Invention

This invention relates to a catalyst composition and method for the oxidation of oxidizeable components of diesel engine exhaust, and more specifically to the treatment of such diesel exhaust to reduce the content of particulates and other pollutants discharged to the atmosphere.

2. Background and Related Art

As is well-known, diesel engine exhaust is a heterogeneous material which contains not only gaseous pollutants such as carbon monoxide ("CO") and unburned hydrocarbons ("HC"), but also soot particles which comprise both a dry, solid carbonaceous fraction and a soluble organic fraction. The soluble organic fraction is sometimes referred to as a volatile organic fraction ("VOF"), which terminology will be used herein. The VOF may exist in diesel exhaust either as a vapor or as an aerosol (fine droplets of liquid condensate) depending on the temperature of the diesel exhaust.

Oxidation catalysts comprising a platinum group metal dispersed on a refractory metal oxide support are known for use in treating the exhaust of diesel engines in order to convert both HC and CO gaseous pollutants and particulates, i.e., soot particles, by catalyzing the oxidation of these pollutants to carbon dioxide and water. One problem faced in the treatment of diesel engine exhaust is presented by the presence of sulfur in diesel fuel. Upon combustion, sulfur forms sulfur dioxide and the oxidation catalyst catalyzes the $SO_2$ to $SO_3$ ("sulfates") with subsequent formation of condensible sulfur compounds, such as sulfuric acid, which condense upon, and thereby add to, the mass of particulates. The sulfates also react with activated alumina supports to form aluminum sulfates, which render activated alumina-containing catalysts inactive. In this regard, see U.S. Pat. No. 4,171,289 at column 1, line 39 et seq. Previous attempts to deal with the sulfation problem include the incorporation of large amounts of sulfate-resistant materials such as vanadium oxide into the support coating, or the use of alternative support materials such as a-alumina (alpha), silica and titania, which are sulfate-resistant materials.

The prior art also shows an awareness of the use of zeolites, including metal-doped zeolites, to treat diesel exhaust. For example, U.S. Pat. No. 4,929,581 discloses a filter for diesel exhaust, in which the exhaust is constrained to flow through the catalyst walls to filter the soot particles. A catalyst comprising a platinum group metal-doped zeolite is dispersed on the walls of the filter to catalyze oxidation of the soot to unplug the filter.

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature. In this regard, see for example U.S. Pat. No. 5,125,231 which discloses (columns 5–6) the use of platinum group metal-doped zeolites as low temperature hydrocarbon adsorbents as well as oxidation catalysts.

SUMMARY OF THE INVENTION

Generally, in accordance with the present invention, there is provided a catalyst composition and a method for oxidizing oxidizeable components of diesel engine exhaust in which at least some of a volatile organic fraction of the diesel exhaust is converted to innocuous materials, and in which gaseous HC and CO pollutants may also be similarly converted. The objectives of the invention are attained by an oxidation catalyst comprising a catalytic material comprising a mixture of high surface area ceria, a zeolite and, optionally, a high surface area alumina. The catalytic material optionally may carry a low loading of platinum catalytic metal dispersed thereon or palladium catalytic metal dispersed thereon. Alternatively, or in addition, the zeolite of the catalyst composition may be doped, e.g., ion-exchanged, with a catalytic moiety such as one or more of hydrogen ion, platinum, copper, nickel, cobalt, iron, etc. The method of-the invention is attained by flowing a diesel engine exhaust, e.g., the exhaust of a diesel-powered automobile or light truck, into contact under oxidation reaction conditions with a catalyst composition as described above.

Specifically, in accordance with the present invention there is provided a catalyst composition for treating a diesel engine exhaust stream containing a volatile organic fraction, which composition comprises a refractory carrier on which is disposed a coating of a catalytic material comprising a catalytically effective amount of ceria and, optionally, a catalytically effective amount of alumina, each having a BET surface area of at least about 10 $m^2/g$, preferably a surface area of from about 25 $m^2/g$ to 200 $m^2/g$, and a zeolite, for example, Beta zeolite or a zeolite selected from the group consisting of Y-zeolite, pentasil (e.g., ZSM-5), Mordenite, and mixtures thereof.

In one aspect of the present invention, the zeolite comprises a three-dimensional zeolite characterized by pore openings whose smallest cross-sectional dimension is at least about 5 Angstroms and having a silicon to aluminum atomic ratio ("Si:Al atomic ratio") of greater than 5, e.g., a Si:Al atomic ratio of from about 5 to 400.

In another aspect of the invention, the zeolite comprises from about 10 to 90, preferably from about 20 to 70, percent by weight, the alumina comprises from about 60 to 5, preferably from about 50 to 20, percent by weight, and the ceria comprises from about 60 to 5, preferably from about 50 to 20, percent by weight, of the combined weight of the zeolite, the alumina and the ceria.

Yet another aspect of the invention provides for the zeolite to be doped with a catalytic moiety, e.g., ion-exchanged or impregnated, with an ion or with a neutral metal-containing species selected from the group consisting of one or more of hydrogen, platinum, rhodium, palladium, ruthenium, osmium, iridium, copper, iron, nickel, chromium and vanadium, preferably, one or both of platinum and iron.

Still another aspect of the invention provides that the refractory carrier has a plurality of parallel exhaust flow passages extending therethrough and defined by passage walls on which the catalytic material is coated, and further comprising either dispersed platinum carried on the catalytic material in an amount of from about 0.1 to about 60, e.g., 0.1 to 15, preferably 0.1 to 5, g/ft$^3$ or dispersed palladium carried on the catalytic material in a quantity of from about 0.1 to 200, preferably 20 to 120, g/ft$^3$.

In accordance with the method aspect of the present invention, there is provided a method for treating a diesel engine exhaust stream containing a volatile organic fraction, the method comprising contacting the stream with any of the catalyst compositions described above under oxidizing conditions including a temperature high enough to catalyze oxidation of at least some of the volatile organic fraction. For example, the temperature of the exhaust stream initially contacted with the catalyst composition may be from about 100° C. to 800° C.

DEFINITIONS

As used herein and in the claims, the following terms shall have the indicated meanings.

The term "BET surface area" has its usual meaning of referring to the Brunauer, Emmett, Teller method for determining surface area by $N_2$ adsorption. Unless otherwise specifically stated, all references herein to the surface area of a ceria, alumina or other component refer to the BET surface area.

The term "activated alumina" has its usual meaning of a high BET surface area alumina, comprising primarily one or more of γ-, θ- and δ-aluminas (gamma, theta and delta).

The term "catalytically effective amount" means that the amount of material present is sufficient to affect the rate of reaction of the oxidation of pollutants in the exhaust being treated.

The term "inlet temperature" shall mean the temperature of the exhaust, test gas or other stream being treated immediately prior to initial contact of the exhaust, test gas or other stream with the catalyst composition.

The term "doped" used to refer to a zeolite being doped with a metal or hydrogen, and the terms "dope" or "doping" used in the same context, means that the metal or hydrogen moiety is incorporated within the pores of the zeolite, as distinguished from being dispersed on the surface of the zeolite but not to any significant degree within the pores of the zeolite. Doping of a zeolite is preferably carried out by known ion-exchange techniques in which a zeolite is repeatedly flushed with a solution containing metal cations (or an acid to provide hydrogen ions), or the zeolite pores are flooded with such solution. However, the defined terms include any suitable technique for incorporating a catalytic moiety, e.g., one or more metals as ions or neutral metal-containing species or hydrogen ions, within the pores of the zeolite, especially by exchange or replacement of cations of the zeolite.

The term "washcoat" refers to a thin, adherent coating of a material, such as the catalytic material of the present invention, disposed on the walls forming the parallel gas flow passages of a carrier, which is typically made of a refractory material such as cordierite or other oxide or oxide mixture, or a stainless steel.

Reference herein or in the claims to ceria or alumina being in "bulk" form means that the ceria or alumina is present as discrete particles (which may be, and usually are, of very small size, e.g., 10 to 20 microns in diameter or even smaller) as opposed to having been dispersed in solution form into another component. For example, the thermal stabilization of ceria particles (bulk ceria) with alumina as described in U.S. Pat. No. 4,714,694, results in the alumina being dispersed into the ceria particles and does not provide the dispersed alumina in "bulk" form, i.e., as discrete particles of alumina.

The abbreviation "TGA" stands for thermogravimetric analysis, which is a measure of the weight change (e.g., weight loss) of a sample as a function of temperature and/or time. The abbreviation "DTA" stands for differential thermal analysis, which is a measure of the amount of heat emitted (exotherm) or absorbed (endotherm) by a sample as a function of temperature and/or time.

BRIEF DESCRIPTION OF THE DRAWINGS

FIG. 1 is a plot of gas-phase HC conversion for sample E-1 and comparative samples C-1, C-2 and C-3 as a function of catalyst inlet temperature;

FIG. 2 is a plot of carbon monoxide conversion for samples E-1 and C-3 as a function of catalyst inlet temperature;

FIG. 3 is a plot of VOF removal for samples E-1 and C-3 as a function of catalyst inlet temperature;

FIG. 4 is a plot of the reduction of the total mass of particulates (TMP) for samples E-1 and C-3 as a function of catalyst inlet temperature;

FIG. 5 is a plot of $SO_3$ and $H_2O$ emissions for samples E-1 and C-3 and for untreated exhaust as a function of catalyst inlet temperature;

FIG. 6 is a plot of gas-phase hydrocarbon conversion as a function of catalyst inlet temperature at 50,000 space velocity for samples E-2, E-3 and C-4;

FIG. 7 is a plot of gas-phase hydrocarbon conversion as a function of catalyst inlet temperature at 90,000 space velocity for samples E-2, E-3 and C-4;

FIG. 8 is a plot of $SO_2$ conversion as a function of catalyst inlet temperature at 90,000 space velocity for samples E-2, E-3 and C-4;

FIG. 9 is a plot of CO conversion as a function of catalyst inlet temperature at 90,000 space velocity for samples E-2, E-3 and C-4.

DETAILED DESCRIPTION OF THE INVENTION AND PREFERRED EMBODIMENTS THEREOF

Figure 1:
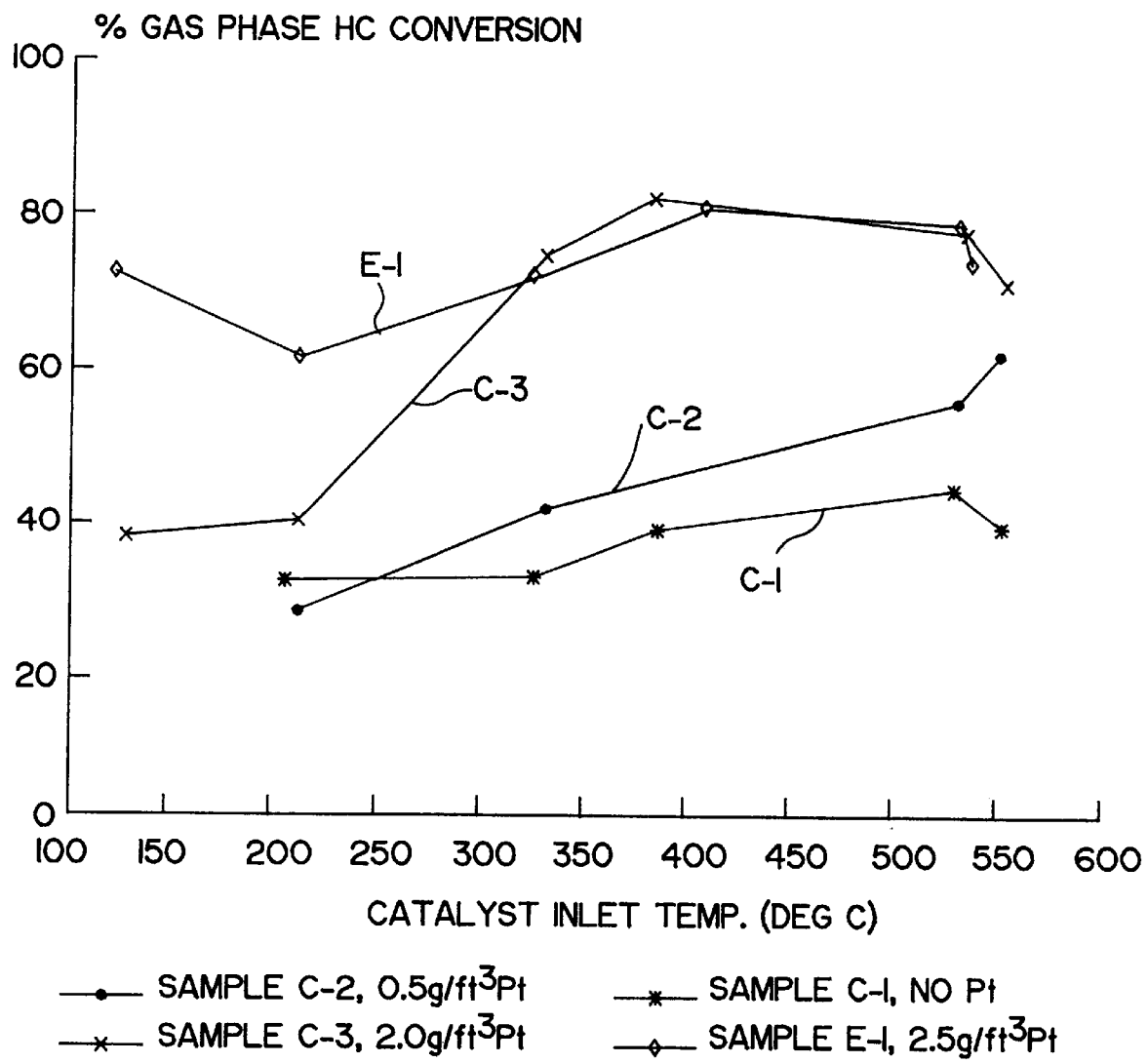
FIGS. 1–5 show graphically the results of the engine test of the catalysts of Example 1, set forth numerically in TABLE I-B; specifically.
Figure 2:
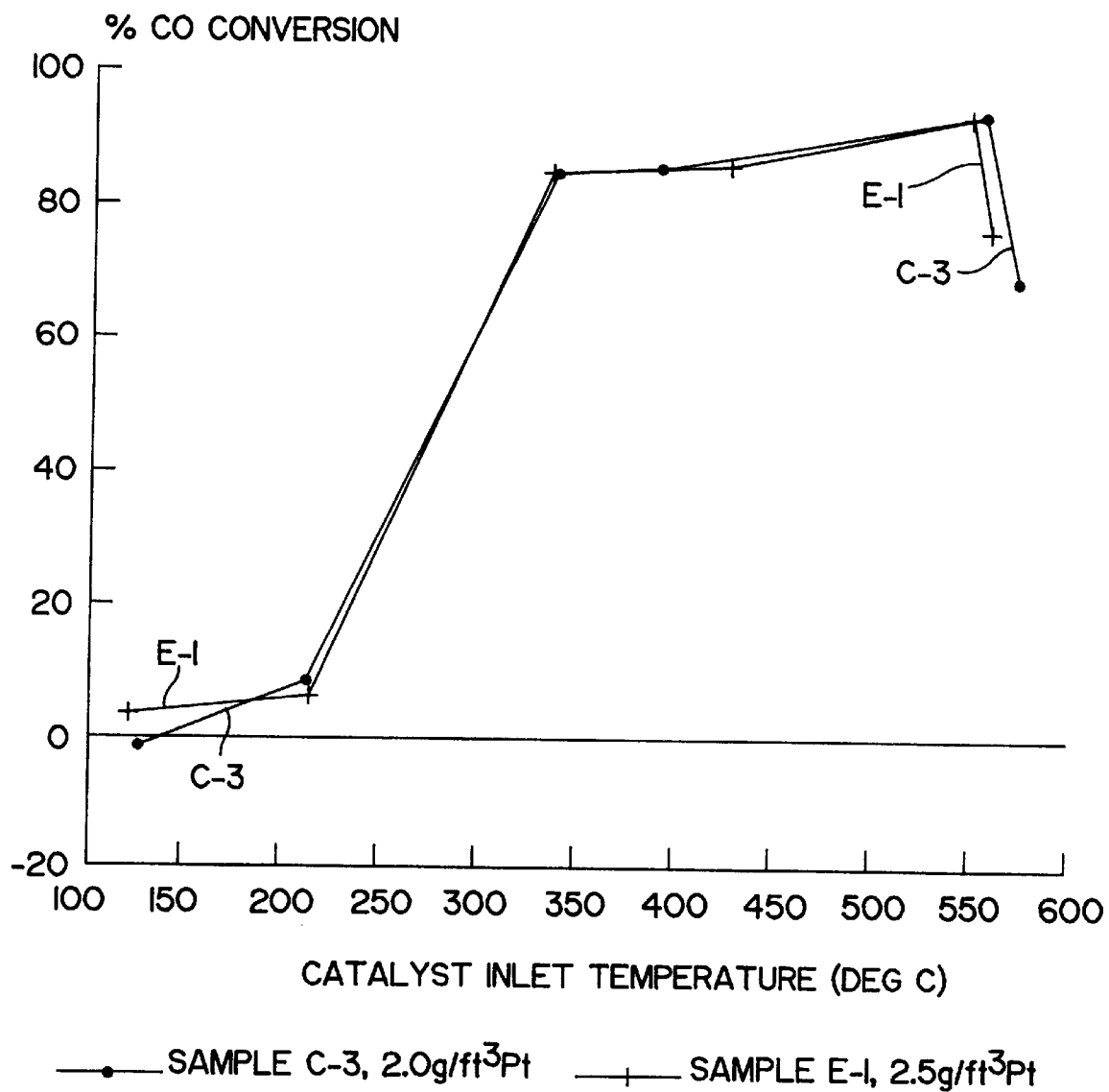

The present invention provides an oxidation catalyst composition which is effective for treating diesel engine exhaust, particularly with regard to reducing the total particulates and HC and CO content of the exhaust. The carbonaceous particulates ("soot") component of diesel engine exhaust is, as discussed above, known to be comprised of relatively dry carbonaceous particulates and a volatile organic fraction ("VOF") comprising high molecular weight hydrocarbons resulting from unburned and partially burned diesel fuel and lubricating oil. The VOF is present in the diesel exhaust as either a vapor phase or a liquid phase, or both, depending on the temperature of the exhaust. Generally, it is not feasible to attempt to remove or treat the dry, solid carbonaceous particulates component of the total particulates by catalytic treatment, and it is the VOF component which can be most effectively removed by conversion via utilization of an oxidation catalyst. Therefore, in order to reduce the total particulates discharged so as to meet present and impending Government regulations concerning maximum allowable total particulates, the volatile organic fraction, or at least a portion thereof, must be oxidized to innocuous $CO_2$ and $H_2O$ by being contacted with an oxidation catalyst under suitable reaction conditions. The required U.S. Government limits for 1991 on HC, CO, nitrogen oxides ("$NO_x$") and total particulate emissions ("TPM") in diesel engine exhaust have been largely met by suitable engine design modifications. For 1994 the HC, CO and NOX limits remain unchanged from 1991 standards but the upper limit on TPM will be reduced from the 1991 level of 0.25 grams per horsepower-hour ("g/HP-hr") to 0.10 g/HP-hr. Although the oxidation catalysts of the present invention, when employed as a diesel exhaust treatment catalyst, are effective for effectuating a reduction in total particulates, they are also capable, especially with the optional addition of platinum or other catalytic metals as described below, of providing the added advantage of also oxidizing a portion of the HC and CO contained in the gaseous component of the diesel engine exhaust. When sulfur or sulfur compounds are present in the exhaust in significant quantities, platinum is eliminated or used in limited amounts so as not to promote the unwanted effect of excessive oxidation of $SO_2$ to $SO_3$.

Further, the zeolite component of the present invention is able to trap hydrocarbon molecules which might otherwise, during periods when the exhaust gas is relatively cool, escape untreated from the catalyst. It is believed that the trapped hydrocarbons are either oxidized within the zeolite or released from the zeolite only when the temperature of the catalyst composition is high enough to effectively catalyze oxidation of the trapped hydrocarbons, or both.

A basic and novel characteristic of the present invention is believed to reside in a catalyst composition comprising the defined combination of ceria, zeolite and, optionally, alumina, and one or both of the optional doping of the zeolite and dispersal of the catalytic metals, platinum or palladium as part of the composition and in the use thereof to treat diesel exhaust streams.

As noted above, the bulk ceria and the bulk alumina may each have a surface area of at least about 10 $m^2/g$, for example, at least about 20 $m^2/g$. Typically, the bulk alumina may have a surface area of from about 120 to 180 $m^2/g$ and the bulk ceria may have a surface area of from about 70 to 150 $m^2/g$.

The fact that a diesel oxidation catalyst composition which may contain activated alumina as a major component thereof has proven to be successful is in itself surprising, in view of the consensus of the prior art that alumina, if used at all in diesel oxidation catalysts, must be a low surface area alumina ($\alpha$-alumina) and/or be used in conjunction with sulfate-resistant refractory metal oxides such as zirconia, titania or silica. It has nonetheless been found that in accordance with one aspect of the present invention, surprisingly, a catalyst composition comprising a combination of high surface area ceria, a suitable zeolite, and, optionally, high surface area alumina, provides a catalytic material which effectively catalyzes the oxidation of the volatile organic fraction so as to provide a significant reduction in total particulates in diesel engine exhaust and is capable of adsorbing and catalyzing the combustion of gaseous hydrocarbons. It should be noted that the prior art generally considers refractory base metal oxides used in diesel oxidation catalysts to be merely supports for the dispersal thereon of catalytically active metals such as platinum group metals. In contrast, the present invention teaches that a catalytic material comprising ceria and, optionally, alumina of sufficiently high surface area (10 $m^2/g$ or higher) and zeolite, dispersed on a suitable carrier, provides a durable and effective diesel oxidation catalyst.

It has further been found that beneficial effects are attained by the optional incorporation of platinum or palladium in the catalyst composition, provided that in the case of platinum, the platinum is present at loadings much lower than those conventionally used in oxidation catalysts. If the catalytic metal platinum or palladium is added to the catalytic composition, it serves to catalyze the oxidation of gas-phase HC and CO pollutants as an added benefit. However, such catalytic metal is not needed to supplement the action of the ceria-zeolite or ceria-alumina-zeolite catalytic material in reducing total particulate emissions. Neither the platinum or palladium catalytic metal nor the metals or hydrogen used to dope the zeolite appear to significantly affect the rate of particulates conversion.

The Zeolite

The zeolite employed serves both to catalyze the oxidation of VOF and to crack the larger VOF molecules and, during periods of relatively low temperature operation, to trap gas-phase hydrocarbons within the zeolite pores. If the zeolite has been doped with one or more catalytic metals or hydrogen, the trapped gas-phase hydrocarbons are brought into intimate contact with the catalytically active cations which facilitates oxidation of the hydrocarbons. In any case, the zeolite pores also serve to retain some of the gas-phase hydrocarbons during start-up or other periods when the catalyst is relatively cool and therefore less effective in catalyzing oxidation reactions, and to release the hydrocarbons only when the catalyst has been heated to higher temperatures. The higher temperatures impart sufficient energy to the trapped hydrocarbon molecules to enable them to escape the zeolite pores, but also enhance oxidation of the hydrocarbons in contact with the catalyst. The zeolite therefore serves not only as a catalyst for VOF oxidation, but as a hydrocarbon filter which traps hydrocarbons during periods of relatively low temperature and concomitant low catalytic activity and retains them until they can be efficiently oxidized by the catalyst during periods of relatively high temperature.

The Carrier (Substrate)

The carrier used in this invention should be relatively inert with respect to the catalytic composition dispersed thereon. The preferred carriers are comprised of ceramic-like materials such as cordierite, $\alpha$-alumina, silicon nitride, zirconia, mullite, spodumene, alumina-silica-magnesia or zirconium silicate, or of refractory metals such as stainless steel. The carriers are preferably of the type sometimes referred to as honeycomb or monolithic carriers, comprising a unitary body, usually cylindrical in configuration, having a plurality of fine, substantially parallel gas flow passages extending therethrough and connecting both end-faces of the carrier to provide a "flow-through" type of carrier. Such monolithic carriers may contain up to about 700 or more flow channels ("cells") per square inch of cross section, although far fewer may be used. For example, the carrier may have from about 7 to 600, more usually from about 200 to 400, cells per square inch ("cpsi").

While this discussion and the following examples relate to flow-through type carrier substrates, wall-flow carriers (filters) may also be used. Wall-flow carriers are generally similar in structure to flow-through carriers, with the distinction that each channel is blocked at one end of the carrier body, with alternate channels blocked at opposite end-faces. Wall-flow carrier substrates and the support coatings deposited thereon are necessarily porous, as the exhaust must pass through the walls of the carrier in order to exit the carrier structure.

The Catalytic Material

The ceria-zeolite or ceria-alumina-zeolite catalytic material may be prepared in the form of an aqueous slurry of ceria, alumina (optional) and zeolite particles, the particles optionally being impregnated with the platinum or palladium catalytic metal component if one is to be dispersed on the catalytic material, and the zeolite may optionally be doped, e.g., may be ion-exchanged with selected cations. The slurry is then applied to the carrier, dried and calcined to form a catalytic material coating ("washcoat") thereon. Typically, the ceria, optional alumina and zeolite particles are mixed with water and an acidifier such as acetic acid, nitric acid or sulfuric acid, and ball milled to a desired particle size.

Dispersed Catalytic Metals: The optional platinum or palladium catalytic metal component is, when used, dispersed onto the ceria and zeolite particles or onto the ceria, alumina and zeolite particles. In such case, the ceria, zeolite and optional alumina act not only as catalysts in their own right but also as a support for the optional platinum or palladium catalytic metal component. (Such platinum or palladium dispersed onto the zeolite is not to be confused with the optional metals—which may be, among others, platinum and/or palladium—with which the zeolite may be doped by ion-exchange or otherwise as discussed in more detail below).

The dispersal of the platinum and/or palladium onto the ceria, the optional alumina and the zeolite may be carried out after the ceria-zeolite or ceria-alumina-zeolite catalytic material is coated as a washcoat onto a suitable carrier, by impregnating the coated carrier with a solution of a suitable platinum and/or palladium compound, followed by drying and calcination. However, the ceria particles or both the ceria and alumina particles may be impregnated with a suitable platinum compound before the ceria or ceria-alumina material (plus the zeolite) is applied to the carrier. The latter technique reduces the amount of platinum and/or palladium dispersed onto the outer surface of the zeolite particles, thereby increasing the amount of catalytic material dispersed on the high surface ceria or ceria-alumina relative to the zeolite. In either case, the optional dispersed platinum or palladium metal may be added to the ceria-zeolite or ceria-alumina-zeolite catalytic material as, e.g., a solution of a soluble platinum compound, the solution serving to impregnate the ceria and optional alumina particles (or a coating thereof on the carrier) and the zeolite, if present at this point of the process. The impregnated components may then be dried and the platinum or palladium fixed thereon. Fixing may be carried out by calcination or by treatment with hydrogen sulfide or by other known means, to render the metal in water-insoluble form. Suitable platinum compounds for use in the foregoing process include potassium platinum chloride, ammonium platinum thiocyanate, amine-solubilized platinum hydroxide and chloroplatinic acid, as is well-known in the art. During calcination, or at least during the initial phase of use of the catalyst, such compounds, if present, are converted into the catalytically active elemental platinum metal or its oxide. Palladium nitrate or palladium analogs of the aforementioned platinum compounds may be used to provide palladium.

Doped Metals or Hydrogen: The zeolite used may optionally be doped either by conventional acid treatment to convert the zeolite to the acid form or by conventional ion-exchange techniques to exchange catalytically active metal cations for cations of the zeolite, or by any other suitable technique which disposes the catalytic metal or metals or hydrogen within the pores of the zeolite. (Conventional acid treatment of a zeolite to convert it to an acid [hydrogen] form of the zeolite is, for economy of expression, referred to herein as doping the zeolite with hydrogen.) For doping the zeolite with metals, conventional ion-exchange techniques including repeated flushing with a solution of suitable metal compounds may be carried out. However, other doping techniques may be employed. For example, if the zeolite pores are flooded with a solution of, e.g., tetraammine platinum hydroxide or tetraammine platinum chloride, the platinum dissociates as a cation, and this positively charged platinum ionic species will adhere to negatively charged sites within the zeolite pores, even if the conventional ion-exchange technique of repeated exchanges of the solution with the zeolite is not carried out. Other techniques are not excluded, as long as the metals are dispersed throughout or within the zeolite pores. The conventional practice of indicating the catalytic moiety used to dope a zeolite by using it as a prefix for the zeolite is followed herein and in the claims. Thus, "H-Mordenite" indicates the hydrogen form of Mordenite, i.e., a hydrogen-doped Mordenite, "Fe-Beta" indicates an iron-doped Beta zeolite, "Fe-Pt-Beta" indicates an iron and platinum-doped Beta zeolite, etc.

Preparing The Catalyst Composition

Generally, a slurry of ceria particles, activated alumina particles and zeolite particles will be deposited upon the carrier substrate and dried and calcined to adhere the catalytic material to the carrier and, when the dispersed platinum or palladium compound is present, to revert the platinum or palladium compound to the elemental metal or its oxide. The zeolite particles may optionally have been doped with one or more metals, e.g., with a combination of platinum and/or base metals, or acid-treated to dope the zeolite with hydrogen, i.e., to provide an acid form of the zeolite.

When the catalytic material or any component is applied to a suitable honeycomb carrier, such as described above, the amount of the component is conventionally expressed herein and in the claims as weight of component per unit volume of catalyst, as this measure accommodates the presence of different sizes of catalyst composition voids provided by different carrier wall thicknesses, gas flow passage dimensions, etc. Grams per cubic inch ("g/$^3$") units are used herein and in the claims to express the quantity of relatively plentiful components such as the ceria-alumina-zeolite catalytic material, and grams per cubic foot ("g/ft$^3$") units are used to express the quantity of the sparingly-used ingredients, such as the platinum metal. For typical diesel exhaust applications, the ceria-zeolite or ceria-alumina-zeolite catalytic material of the present invention generally may comprise from about 0.25 to about 4.0 g/in$^3$, preferably from about 0.25 to about 3.0 g/in³ of the coated carrier substrate. The catalytic material may optionally also include from about 0.1 to 60, preferably from about 0.1 to 15 g/ft³ of dispersed platinum or from about 0.1 to 200, preferably from about 20 to 120 g/ft³ of dispersed palladium. The zeolite may optionally be doped with from about 0.1 to 50 g/ft³ of metal, e.g., from about 1 to 60 g/ft³ of precious metal, and/or from about 0.1 to 200 g/ft³ of base metal or the zeolite may be converted to its hydrogen form. The conversion to hydrogen form may be a 5 to 100 percent hydrogen exchange.

Without wishing to be bound by a particular theory, applicants offer the following hypothesis to explain the superior performance, when used to treat diesel engine exhaust, of the ceria-zeolite or ceria-alumina-zeolite catalytic materials according to this invention. It is believed that diesel exhaust contains a significant proportion of gases or vapors which are close to their dew point, i.e., close to condensing to a liquid, and thereby adding to the VOF portion of the particulates at the conditions obtaining in the exhaust pipe. These "potential particulates" condense in the ceria-zeolite or ceria-alumina-zeolite catalytic materials, their condensation being enhanced by a capillary condensation effect, a known phenomenon in which a capillary-like action facilitates condensation of oil vapors to liquid phase. The small pore size of the high surface area ceria or ceria and alumina components of the catalytic material is believed to provide such capillary condensation action for the VOF. Generally, the higher the surface area of the ceria and optional alumina, the smaller is the pore size. As the exhaust temperature increases during increased work loads imposed on the diesel engine, the condensed hydrocarbon liquids (condensed VOF) are desorbed from the ceria or ceria-alumina components of the catalytic material and volatilize, at which time the catalytic effect of the ceria or the ceria-alumina components of the catalytic material, which provide numerous active sites, and the cracking effect attained by contact of the VOF with the surface of the zeolite, enhances gas-phase oxidation, i.e., combustion, and cracking of the desorbed, re-volatilized hydrocarbon (VOF) vapors. Even if a proportion of the vapors re-volatilized from the condensate is not combusted, the cracking of heavy VOF components to lighter hydrocarbons on the outer surface of the zeolite reduces the total amount of condensibles, so that the total particulates output from the diesel engine is concomitantly further reduced. In this latter regard, the ceria or ceria-alumina component of the catalytic material is believed to act as a trap and a storage medium for condensed or condensible VOF during relatively cool phases of the exhaust, and volatilizes the VOF and cracks it during relatively hot phases. The zeolite serves, during relatively cool phases of the exhaust, to trap gas-phase hydrocarbon components and retain them until temperatures high enough for the platinum or other metal to oxidize at least some of the gas-phase HC are attained. The porous nature of the ceria-zeolite or ceria-alumina-zeolite catalytic material is also believed to promote rapid diffusion of the VOF throughout the washcoat structure, thereby facilitating relatively low temperature gasification and oxidation of the VOF upon increases in temperature of the catalyst during higher engine load (increased exhaust gas temperature) cycles. The presence of sulfates does not significantly adversely affect the capacity of the ceria-zeolite or ceria-alumina-zeolite catalytic material to reduce particulate emissions.

Generally, other ingredients may be added to the catalyst composition of the present invention such as conventional thermal stabilizers for the alumina, e.g., rare earth metal oxides such as ceria. Thermal stabilization of high surface area ceria and alumina to militate against phase conversion of these oxides to less catalytically effective low surface area forms is well-known in the art, although thermal stabilization of alumina is not usually needed for diesel exhaust service wherein exhaust temperatures are typically lower than for gasoline-fueled engines. Such thermal stabilizers may be incorporated into the bulk ceria or into the optional bulk activated alumina, by impregnating the ceria (or alumina) particles with, e.g., a solution of a soluble compound of the stabilizer metal, for example, an aluminum nitrate solution in the case of stabilizing bulk ceria. Such impregnation is then followed by drying and calcining the impregnated ceria particles to convert the aluminum nitrate impregnated therein into alumina, to thermally stabilize the ceria. A suitable technique is shown in U.S. Pat. No. 4,714,694 to C. Z. Wan et al (the disclosure of which is incorporated by reference herein), in which ceria particles are impregnated with a liquid dispersion of an aluminum compound, e.g., an aqueous solution of a soluble aluminum compound such as aluminum nitrate, aluminum chloride, aluminum oxy-chloride, alumnium acetate, etc. After drying and calcining the impregnated ceria in air at a temperature of, e.g., from about 300° C. to 600° C. for a period of ½ to 2 hours, the aluminum compound impregnated into the ceria particles is converted into an effective thermal stabilizer for the ceria, to provide an "alumina-stabilized ceria".

In addition, the catalyst compositions of the invention may contain other catalytic ingredients such as other base metal promoters or the like. However, in one embodiment, the catalyst composition of the present invention consists essentially only of the high surface area ceria and the zeolite, and, optionally, the high surface area alumina, preferably present in the weight proportions given above, with or without thermal stabilizers impregnated into the alumina and ceria and, optionally, including palladium or limited amounts of platinum dispersed thereon, and optionally, employing a doped zeolite as described above.

Examples A and B show typical methods of preparing metal-doped zeolites which are useable as components of the catalytic material of the present invention.

EXAMPLE A

Preparation of Fe-Beta Zeolite

To prepare a sample of iron-exchanged Beta zeolite (Fe-Beta zeolite), 17 grams of iron [II] sulfate was dissolved in 800 ml water. One hundred grams of Beta zeolite was added to the solution which was then stirred for 1 hour at a temperature of 70° C. to 80° C. The resulting slurry was then filtered and washed with 2 liters of water, dried at 120° C. and calcined at 540° C. The resulting material comprised 1.65% by weight iron. This technique was employed to prepare the Fe-Beta zeolite catalysts used in the following Examples.

EXAMPLE B

Preparation of Pt-Fe-Beta Zeolite

A solution was prepared using 0.54 grams of tetraammine platinum chloride in 500 ml water, to which 100 grams of Beta zeolite was added. The mixture was stirred for 24 hours at room temperature so that platinum ions replaced sodium ions in the zeolite material. The slurry was then filtered and washed with 2 liters water, dried and calcined at 540° C. The resulting calcined, platinum ion-exchanged Beta zeolite was then ion-exchanged with iron [II] sulfate by adding the zeolite to a solution of iron [II] sulfate equivalent to 17 grams of iron [II] sulfate in 800 ml water. The solution was allowed to stand for about 1 hour and was then stirred at 70° C. to 80° C. for 1 hour. The resulting slurry was then filtered, washed with water, dried at 120° C. and calcined at 540° C. On a dry basis, the Beta zeolite comprised 1.6% by weight iron and 0.25% by weight platinum. This technique was employed to prepare the Fe-Pt-Beta zeolite catalyst components used in the following Examples.

EXAMPLE 1

A. A catalyst according to the present invention was prepared by coating a honeycomb monolith with a catalytic material comprised of a zeolite, bulk ceria and bulk alumina to provide 0.84 g/in$^3$ γ-alumina, 0.83 g/in$^3$ alumina-stabilized ceria and 0.83 g/in$^3$ Fe-Beta zeolite. The honeycomb monolith was a cordierite substrate measuring 9 inches in diameter by 6 inches long and having 400 cpsi. The catalyst material also provided 2.5 g/ft$^3$ of platinum, 80 percent by weight of which was dispersed on the alumina, and 20 percent by weight of which was dispersed on the ceria. This catalyst was designated E-1.

B. For comparison, three other catalysts were prepared to provide a series of three otherwise identical compositions containing a ceria-alumina catalytic material but no zeolite and, in two cases, having platinum dispersed thereon. The platinum loadings of these comparative catalysts were 0.0, 0.5 and 2.0 g/ft$^3$ platinum. Each comparative catalyst comprised a γ-alumina undercoat at a loading of 1.0 g/in$^3$ upon which was coated a top coat layer comprised of 1.05 g/in$^3$ γ-alumina plus 0.90 g/in$^3$ alumina-stabilized ceria. The alumina-stabilized ceria contained 2.5 weight percent Al$_2$O$_3$ based on the combined weight of bulk ceria and stabilizing alumina dispersed therein. The catalysts were coated onto a 9 inches diameter by 6 inches long, 400 cpsi cordierite substrate. As used herein, "cpsi" is an abbreviation for cells per square inch, denoting the number of gas flow passages per square inch of face area of the substrate. The resulting catalyst samples were designated as C-1 (0.0 g/ft$^3$ platinum, aged 24 hours as described below), C-2 (0.5 g/ft$^3$ platinum, aged 25 hours) and C-3 (2.0 g/ft$^3$ platinum, aged 24 hours).

C. The four catalyst samples were conditioned prior to evaluation using an aging cycle involving 20 minutes each at Modes 2,6 and 8 of the European Thirteen Mode Cycle Test Procedure (ECE R.49 Thirteen Mode Cycle). This Test Procedure is set forth in the Society of Automotive Engineers Publication, SAE Paper #880715, published at the International Congress and Exposition, Detroit, Mich., Feb. 29 through Mar. 4, 1988, by Georgio M. Cornetti et al. The disclosure of this SAE publication is incorporated by reference herein. Prior to testing to develop the data of TABLE I-B and FIGS. 1–5, the three catalyst samples were aged 24 or 25 hours as indicated above on a Cummins 6BT turbocharged diesel engine having a 5.9 liter displacement and rated at 230 horsepower. For both aging and test purposes, the engine was run with low sulfur fuel (0.05 weight percent sulfur) under steady state conditions using test modes selected from the aforesaid European Thirteen Mode Cycle Test Procedure.

The engine conditions for the test modes along with average (for five runs) catalyst inlet temperatures and baseline emissions (of untreated engine exhaust) are shown in TABLE I-A.

TABLE I-A

Cummins 6BT 230 HP Turbocharged Diesel Engine, 5.9 Liter Displacement, Steady State Conditions For Catalyst Tests

| Test Mode No. | rpm | % Load | Average Catalyst Inlet Temp. (° C.) | Average Emissions (g/bhp-hr)[1] | | | |
|---|---|---|---|---|---|---|---|
| | | | | TPM | VOF | HC | CO |
| | Engine Conditions | | | Baseline Emissions - Untreated Exhaust | | | |
| 1 | 803 | Low | 128 ± 16 | — | 0.078 | 1.04 | 3.01 |
| 2 | 1560 | 10 | 214 ± 3 | 0.265 | 0.137 | 0.541 | 2.57 |
| 10 | 2515 | 50 | 338 ± 4 | 0.151 | 0.047 | 0.212 | 0.68 |
| 4 | 1609 | 50 | 400 ± 4 | 0.146 | 0.023 | 0.103 | 0.52 |
| 6 | 1609 | 100 | 549 ± 5 | 0.221 | 0.016 | 0.099 | 2.23 |
| 8 | 2515 | 100 | 571 ± 2 | 0.097 | 0.010 | 0.122 | 0.46 |

[1]grams per brake horsepower hour

The conversion activities of each of these catalysts was evaluated in selected steady state modes of an ECE R.49 Thirteen Mode Cycle Test Procedure using a 1991 Cummins 6BT (6 liter DI/TC) engine after approximately 24 hours aging, as described above. The exhaust inlet temperature and the conversion rate for the conversion of VOF, TPM (total particulates), hydrocarbons and carbon monoxide were measured for various modes of the test, and are set forth in the following TABLE I-B.

TABLE I-B

ECE Thirteen Mode Cycle Test

| DOC Sample | Pt Load. (g/ft$^3$) | Mode # | Cat. Inlet Temp. (° C.) | % Removal | | | |
|---|---|---|---|---|---|---|---|
| | | | | VOF | TPM | HC | CO |
| C-1 | 0.0 | 2 | 209 | 72 | 63 | 31 | 1 |
| | | 10 | 335 | 60 | 27 | 32 | 7 |
| | | 4 | 399 | 62 | 18 | 38 | 18 |
| | | 6 | 547 | 84 | −40 | 44 | 27 |
| | | 8 | 572 | 79 | −181 | 39 | −4 |
| C-2 | 0.5 | 2 | 215 | 60 | 45 | 27 | 6 |
| | | 10 | 343 | 58 | 28 | 41 | 63 |
| | | 6 | 549 | 91 | −64 | 56 | 85 |
| | | 8 | 570 | 80 | −201 | 62 | 45 |
| C-3 | 2.0 | 1 | 127 | 56 | 52 | 37 | −1 |
| | | 2 | 215 | 61 | 61 | 39 | 8 |
| | | 10 | 341 | 53 | 31 | 74 | 86 |
| | | 4 | 397 | 61 | 22 | 82 | 87 |
| | | 6 | 554 | 89 | −60 | 78 | 95 |
| | | 8 | 572 | 79 | −200 | 71 | 70 |
| E-1 | 2.5 | 1 | 121 | 55 | 75 | 72 | 3 |
| | | 2 | 217 | 83 | 63 | 61 | 6 |
| | | 10 | 338 | 66 | 37 | 72 | 86 |
| | | 4 | 425 | 61 | −1 | 81 | 87 |
| | | 6 | 552 | 90 | −72 | 79 | 95 |
| | | 8 | 557 | 70 | −172 | 74 | 77 |

Figure 3:
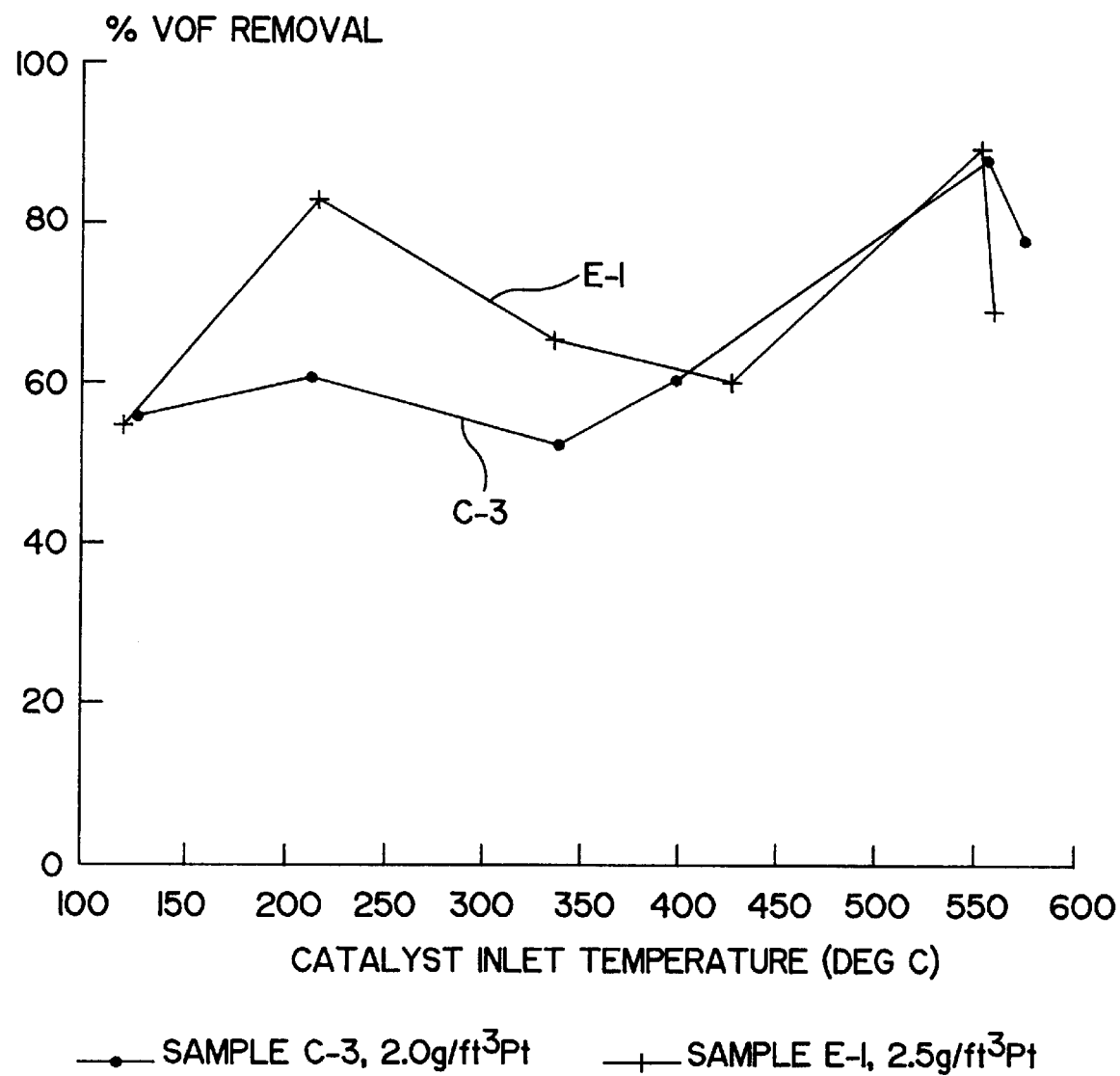
Figure 4:
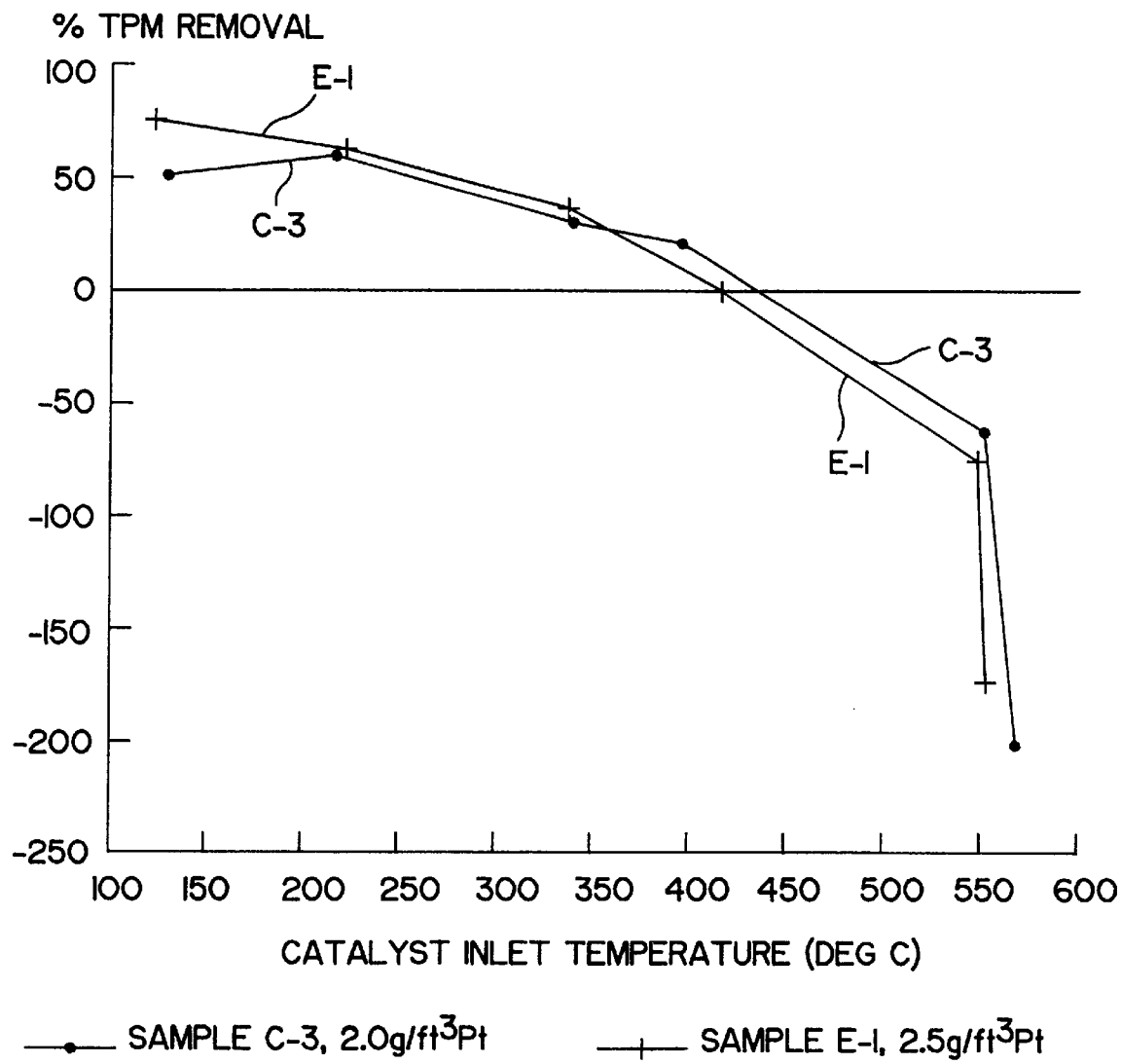
Figure 5:
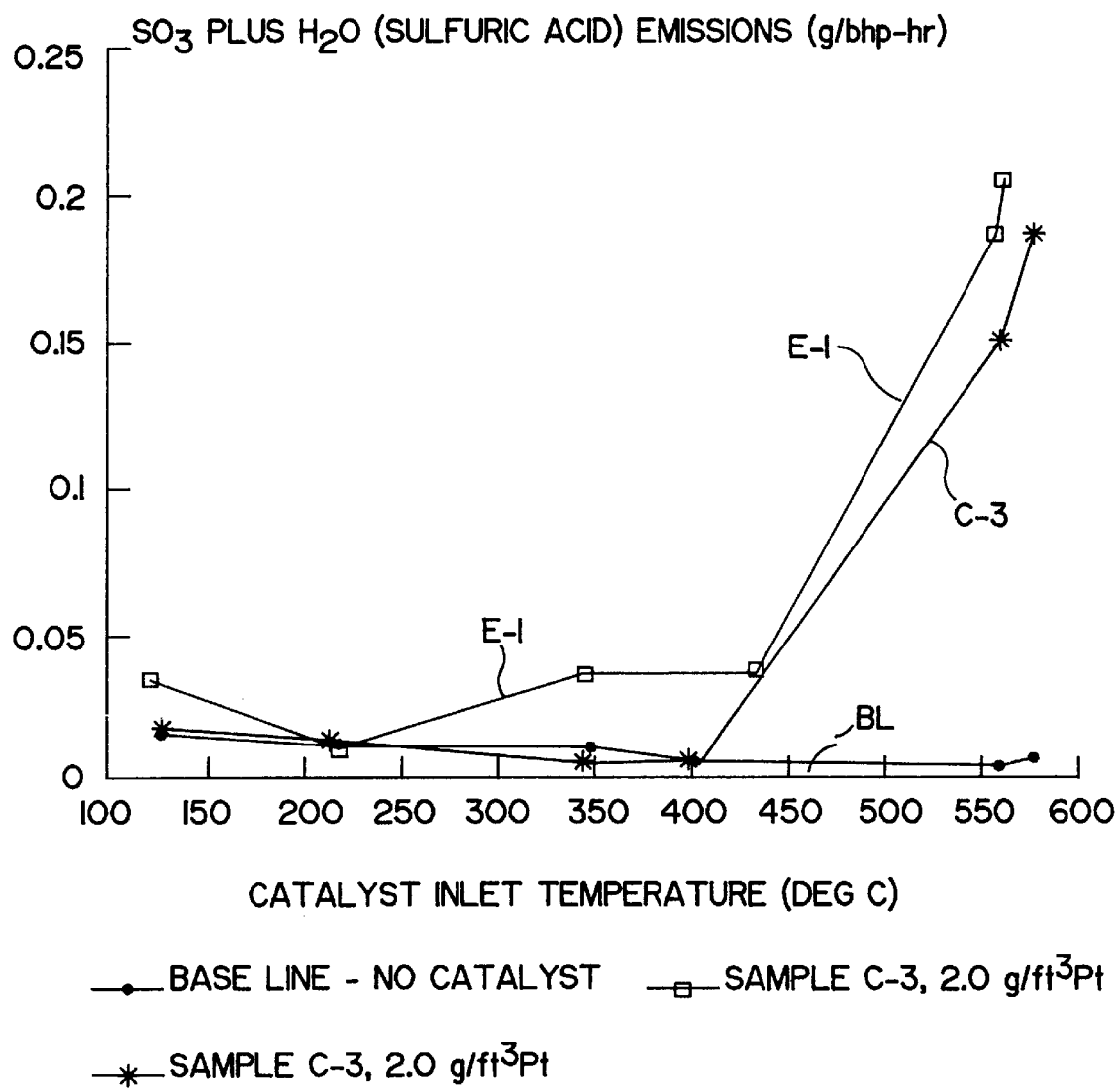
Figure 6:
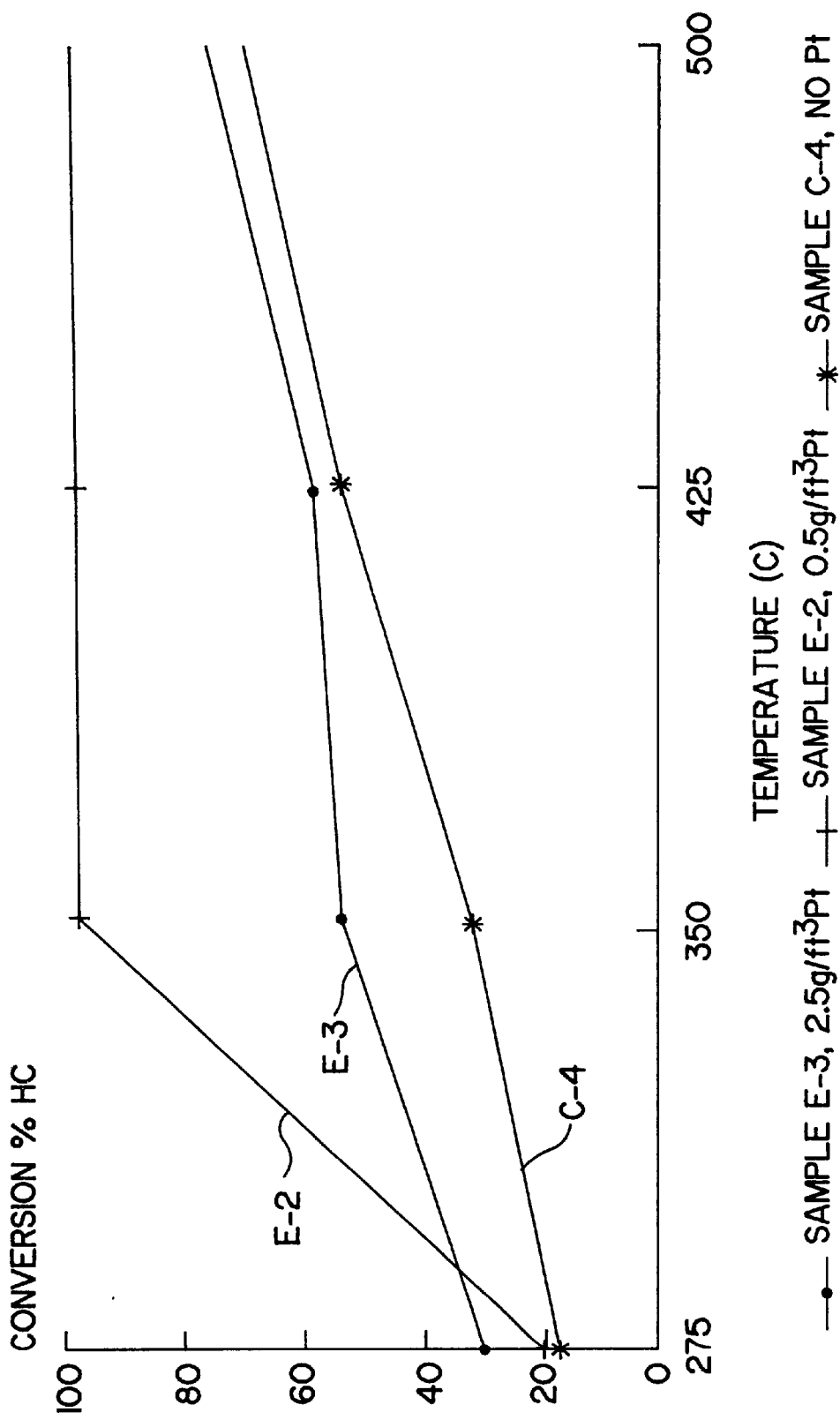
FIGS. 6–9 are plots of hydrocarbon, SO2 and CO conversion for samples E-2, E-3 and C-4 of Example 2: specifically.
Figure 7:
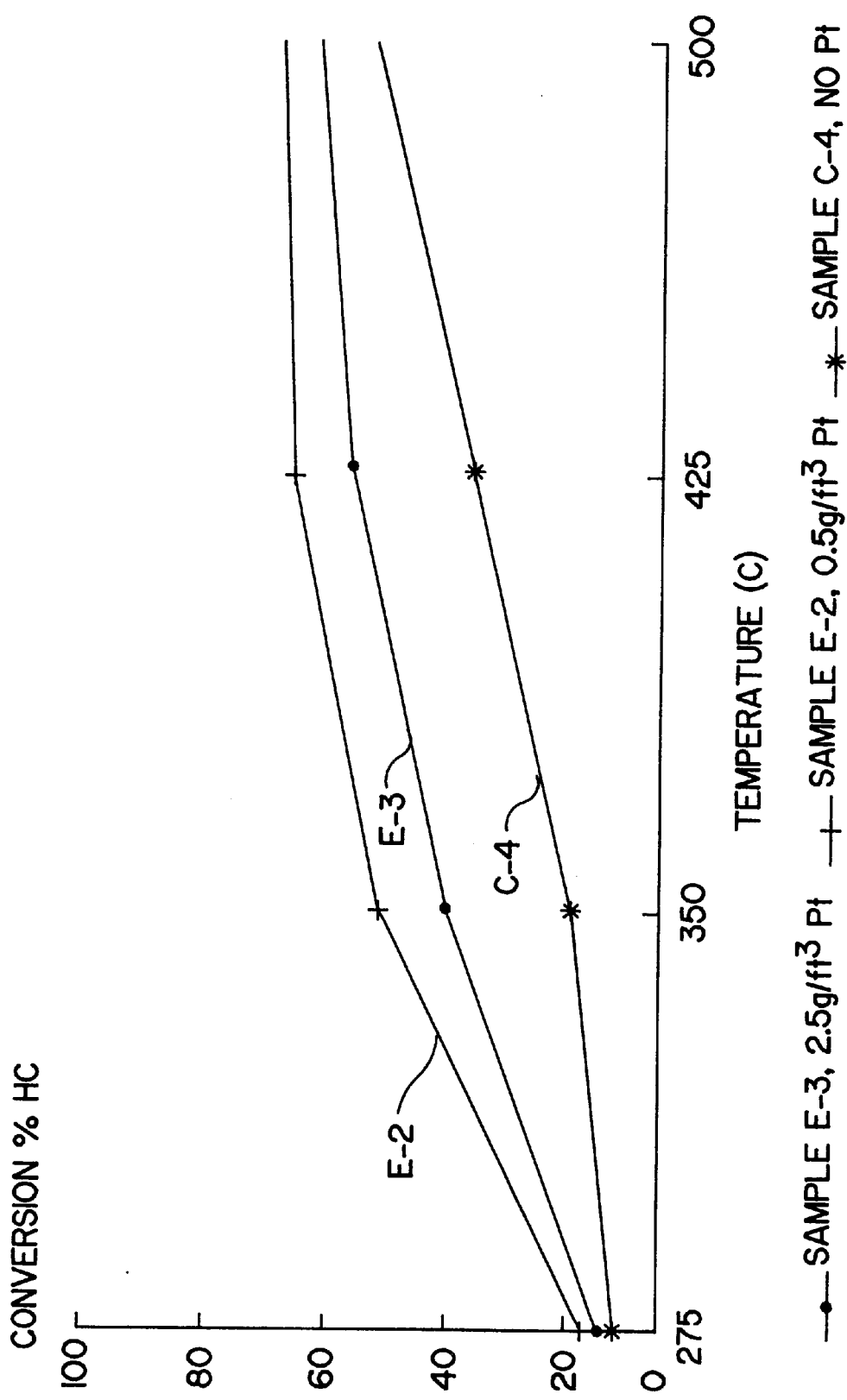
Figure 8:
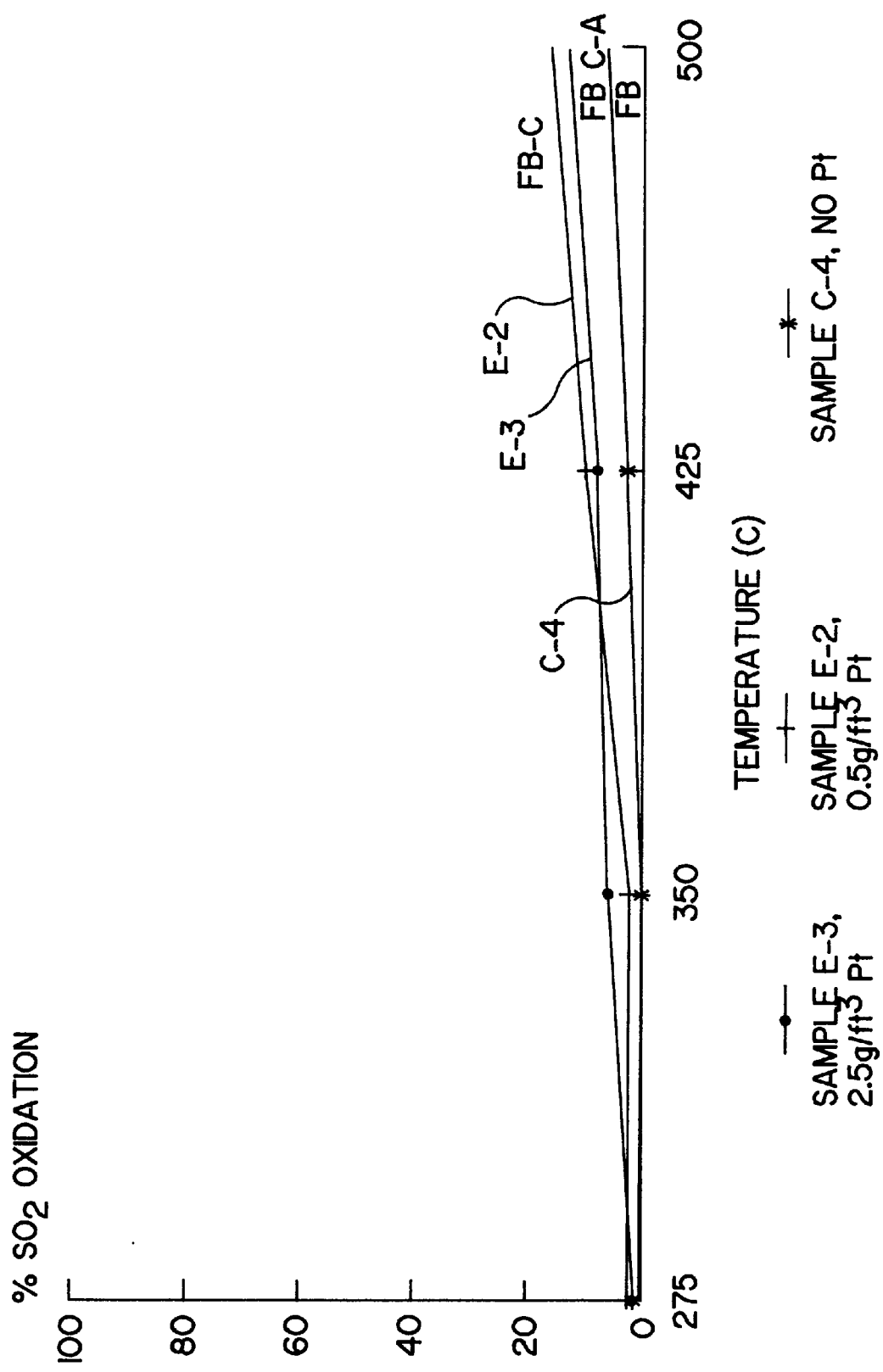
Figure 9:
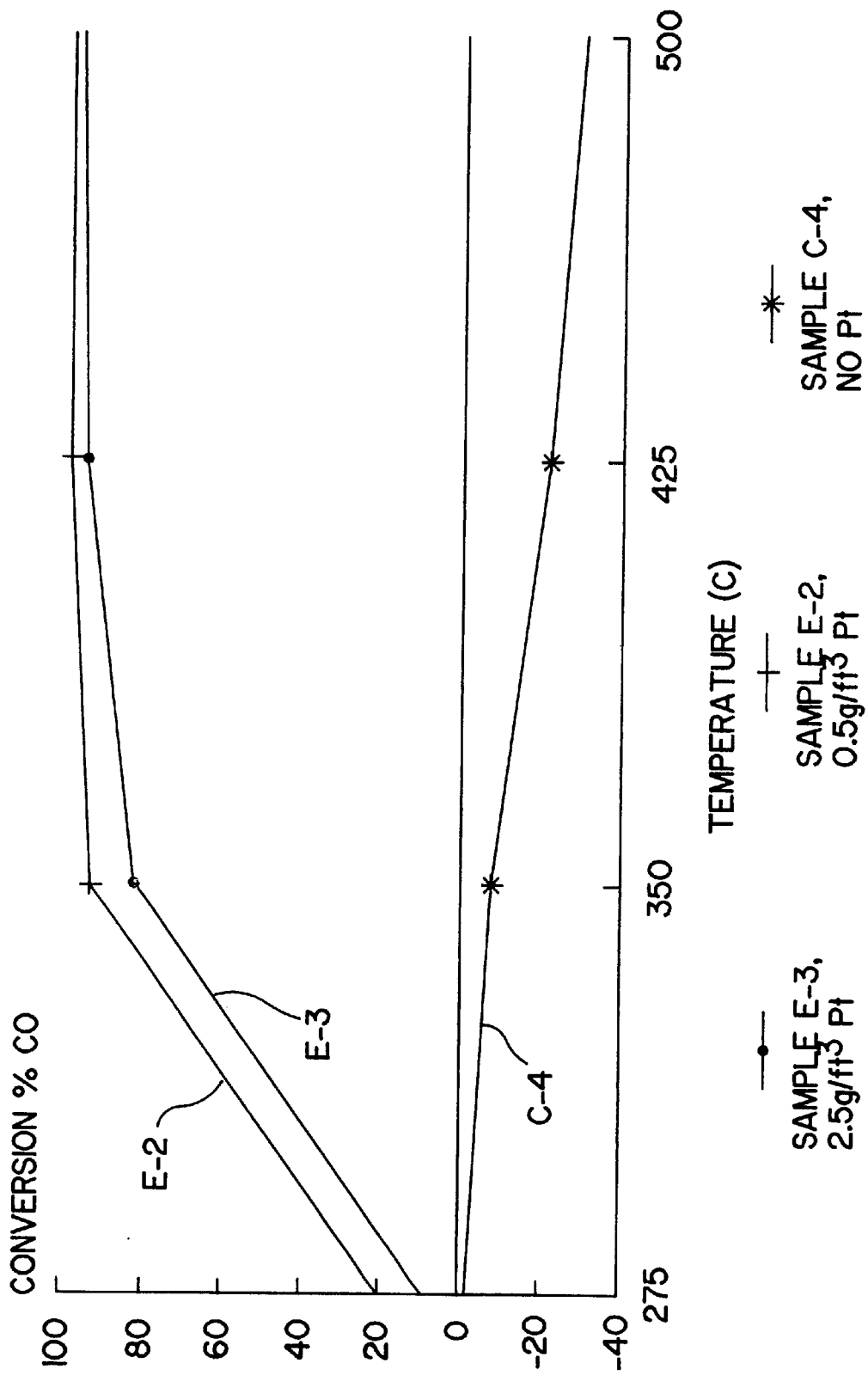

The data of TABLE I-B are shown graphically in FIGS. 1–5 and show that the catalyst according to the present invention (E-1) exhibited high levels of gas-phase hydrocarbon removal in the lowest temperature modes (modes 1 and 2) of the test (72% and 61%) compared to the comparative samples under the same conditions (e.g., 37% and 39% for catalyst C-3). At higher temperatures, e.g., 340° and above, gas-phase hydrocarbon conversion rates of sample E-1 were comparable to sample C-3 but still markedly superior to samples C-1 and C-2. The superior gas-phase hydrocarbon conversion performance of sample E-1, especially at low temperature regimes, is attributed to the Fe-Beta zeolite. Carbon monoxide conversion was essentially the same for sample E-1 and the comparative sample C-3, as will be readily appreciated from FIG. 2, indicating that the addition of the iron-Beta zeolite did not appear to have an effect on carbon monoxide conversion efficiency. The overall VOF removal performance of sample E-1 was slightly better than any of the comparative samples. FIG. 3 graphically illustrates VOF conversion efficiency of catalyst E-1 and comparative sample C-3.

EXAMPLE 2

Catalyst Comprising Fe-Beta Zeolite and Platinum on Alumina and Ceria

A.(1) A catalyst component comprising platinum dispersed on Fe-Beta zeolite and on ceria was prepared as follows. Two hundred grams of Fe-Beta zeolite containing 1.65% by weight iron was made into a water-based slurry and milled for 3 hours. The pH was adjusted to 4.5 by the addition of monoethanolamine. An amine-solubilized platinum hydroxide solution was added to the slurry, followed by acetic acid to precipitate the platinum, which constituted 0.029% by weight. The slurry was further milled to reduce the particle size so that 90 percent of the particles have a diameter of 12 microns or less.

(2) Separately, a similar platinum salt solution was slowly added to 650 grams of ceria having a BET surface area of 143 $m^2/g$ that had previously been impregnated with 2.5% by weight alumina stabilizer (basis, weight of ceria plus alumina stabilizer) by a conventional technique of impregnating the ceria with a solution of an alumina precursor and drying and calcining the impregnated ceria. Sufficient platinum salt solution was added to deposit 0.029% platinum onto the ceria, by weight of ceria plus platinum. The platinum was fixed onto the ceria by adding 5 cc of acetic acid per 100 grams of solids to the Pt/ceria mixture. The Pt/ceria mixture was milled in water so that 90% of the particles have a diameter of 12 microns or less to produce a slurry having 47.8% solids.

(3) Portions of the two slurries of parts (1) and (2) were mechanically mixed to produce a slurry comprising about 50% ceria, 50% Fe-Beta zeolite and 0.029% platinum, all by weight (dry basis). A portion of the mixed slurry was dried overnight at 100° C. in air and then calcined in air at 450° C. for 1 hour. A portion of the dried, calcined powder was made into a slurry and coated onto a cordierite honeycomb 1.5 inches in diameter, 3 inches long and having 400 cpsi, at a loading of 1.0 $g/in^3$. This washcoat loading yielded 0.5 $g/ft^3$ of platinum. The coated monolith was dried and calcined and designated E-2.

B.(1) A catalyst was prepared from a slurry comprising three types of particles, platinum-bearing ceria particles, platinum-bearing alumina particles and Fe-Beta zeolite particles,-i.e., Beta zeolite ion-exchanged with iron. These particles were prepared as separate slurries before being mixed together.

(2) The slurry of platinum-bearing ceria particles was prepared by impregnating ceria particles having a BET surface area of 143 $m^2/g$ with a platinum salt solution as described above in part A(1) to obtain a platinum metal loading of 0.035% upon calcination. The resulting particles were milled to an average particle size of less than 12 microns.

(3) The slurry of platinum-bearing alumina particles was prepared by impregnating alumina having a BET surface area of 150 $m^2/g$ with a platinum salt solution to yield 0.138% by weight platinum metal upon calcination. The particles were milled to an average particle size less than 12 microns.

(4) A slurry of Fe-Beta zeolite particles was prepared by milling the particles to an average particle size of less than 12 microns.

(5) The foregoing three slurries were mechanically mixed to form a composite slurry yielding 33.18% ceria, 33.18% Fe-Beta zeolite, 33.58% alumina and 0.058% platinum by weight (dry basis). The composite slurry was coated onto an oval-shaped honeycomb monolith having cross section dimensions of 3.18×6.68 inches, a length of 3.15 inches and 400 cpsi, at a total loading of 2.5 $g/in^3$, consisting of 0.84 $g/in^3$ alumina, 0.83 $g/in^3$ ceria, 0.83 $g/in^3$ Fe-Beta zeolite and 0.0014 $g/in^3$ (equivalent to 2.4 $g/ft^3$) platinum. The catalyst-coated honeycomb carrier was dried in air at 100° C. and then calcined at 450° C. for 2 hours. A sample core 3 inches long and 1.5 inches in diameter was drilled from the calcined honeycomb and designated E-3.

(6) Fe-Beta zeolite having 1.65 weight percent iron was made into an aqueous slurry and milled so that about 90 percent of the particles had a diameter of 12 microns or less. The slurry was then coated onto a carrier monolith 1.5 inches in diameter and 3.0 inches in length having 400 cpsi. The coated carrier was calcined at 450° C. in air for 1 hour and had a washcoat loading of 1.0 $g/in^3$ (dry basis). This sample was designated C-4.

C. The catalysts designated E-2, E-3 and C-4 were tested in a laboratory diagnostic reactor for comparison. The inlet stream of the diagnostic reactor comprised 200 ppm heptane measured as $C_1$, 4.5% $CO_2$, 50 ppm $SO_2$, 1000 ppm NO, 200 ppm CO, 10% $O_2$, 10% $H_2O$, balance $N_2$. The inlet temperatures of the test gas stream to the catalyst were 275, 350, 425 and 500° C.

The results of the diagnostic laboratory reactor tests as set forth in FIGS. 6–9 show that the catalysts of the present invention, E-2 and E-3, exhibited substantially better gas phase HC activity at a space velocity ("sv") of 50,000/hr and better HC activity at sv=90,000/hr than did the catalyst containing only Fe-Beta zeolite (C-4). Furthermore, E-2 gave better results than E-3 despite having a lower Pt loading (0.5 vs. 2.5 $g/ft^3$). It is also clear that the catalysts of the present invention gave much better CO conversion activity than did the catalyst containing only Fe-Beta zeolite, the latter exhibiting net negative CO conversion due to partial oxidation of HC to form CO in an amount to give a higher concentration in catalyst outlet stream than in the inlet stream. Finally, the catalysts of the present invention exhibit very low $SO_2$ oxidation levels due to the low Pt loading, indicating control of sulfate-make by the catalyst which would otherwise contribute to particulate emissions. As used herein and throughout this application space velocity ("sv") has the usual meaning of the volumes of the exhaust stream or test gas, measured at standard conditions of temperature and pressure, passing through the volume of the catalyst composition (the dimensional volume of the coated honeycomb monolith) per hour.

EXAMPLE 3

Catalyst Comprising $Pt/CeO_2$, $Pt/Al_2O_3$ and Fe-Beta Zeolite

A. A catalyst according to the present invention was prepared by coating two differently configured honeycomb carriers with identical loadings of the same catalytic material. One honeycomb carrier to be tested on an Audi 100 automobile as described below measured 5.66 inches in diameter by 6 inches long and had 400 cpsi and was designated an "A-type carrier". A second honeycomb carrier to be tested on a Mercedes Benz 200D automobile as described below was of oval configuration and measured 3.03 inches by 5.78 inches (minor and major axes of the oval face) by 6 inches long and had 200 cpsi. This carrier was designated an "M-type carrier". Both the A-type carrier and the M-type carrier were coated with 2.5 g/in$^3$ of a washcoat comprising 33% by weight alumina-stabilized ceria and 34% by weight γ-alumina with platinum dispersed on both the ceria and the alumina as described above in Example 2. The washcoat further comprised 33% by weight Fe-Beta zeolite having 1.65% iron by weight. The washcoat yielded a platinum loading of 2.5 g/ft$^3$ platinum distributed equally on the ceria and alumina; there was no platinum on the Fe-Beta zeolite. These catalysts were each designated E-4.

B. A second pair of catalysts according to the present invention was prepared as described in part A above, i.e., one was prepared using an A-type carrier and one using an M-type carrier, except that the platinum loading was 10 g/ft$^3$ dispersed equally on the ceria and alumina, with no platinum on the Fe-Beta zeolite. These catalysts were each designated E-5.

C.(1) A comparative catalyst was prepared by coating an M-type carrier with 2.5 g/in$^3$ of a catalyst washcoat consisting of 46% by weight alumina-stabilized ceria having a BET surface area of 143 m$^2$/g and 54% by weight γ-alumina having a BET surface area of 150 m$^2$/g. The catalyst was prepared by separately impregnating bulk alumina and bulk ceria with an amine-solubilized platinum hydroxide solution, precipitating the platinum with acetic acid and milling the particles to a size of 90 percent of the particles having a diameter of 12 microns or less. The two slurries were then blended to provide a 50% solids slurry which was used to coat the honeycomb carrier. The washcoat yielded a platinum loading of 2.0 g/ft$^3$ equally dispersed on the ceria and alumina. This catalyst was designated comparative sample C-X.

(2) Catalyst pairs respectively designated C-5 and C-6 were prepared as described for catalyst C-X, i.e., two C-5 samples, one on each of an A-type carrier and an M-type carrier and two C-6 samples, one on each of an A-type and an M-type carrier, except that the platinum loadings were 5.0 g/ft$^3$ on the C-5 samples and 10 g/ft$^3$ on the C-6 samples.

(3) A commercial catalyst material comprised a washcoat of 85–90% by weight alumina, 5–7% by weight vanadium oxide (V$_2$O$_5$) and 1–2% by weight platinum coated onto a honeycomb carrier measuring 5.66 inches in diameter by 6 inches long and having 400 cpsi. The catalyst had 60 g/ft$^3$ of catalytic material. This catalyst was designated C-7.

D. The catalysts of parts A, B and C were tested for hydrocarbon conversion, CO activity and SO$_2$ conversion using the exhaust from an Audi 100 automobile having a 5 cylinder, 2.5 liter, direct injected/turbocharged engine with intercooling and exhaust gas recycle and a Mercedes Benz 200D automobile having a 4 cylinder, 2.0 liter, indirect injected/naturally aspirated engine.

The tests were conducted using a chassis dynamometer and emissions measurement instrumentation and techniques for total gas-phase hydrocarbons (HC), carbon monoxide (CO, nitrogen oxides NO$_x$) and total particulates (TPM).

The emissions evaluation test used was the European transient test known as Cycle "A". This test consists of two parts. The first, the ECE part, is characterized by lower loads and cooler exhaust temperatures than the second part, the EUDC (Extra Urban Driving Cycle). Emissions are measured for each of these parts of the test and the results are weighed and combined to give emissions for the overall Cycle "A" test. Emissions are expressed in grams/kilometer (g/km).

The results of the Cycle A tests are set forth in TABLE II-A and TABLE II-B.

TABLE II-A

Test Results for Audi 100 Diesel Automobile

| Test Part | Cata-lyst | Pt Load. g/ft$^3$ | Hydrocarbons g/km$^1$/ | %$^2$ | Carbon Monoxide g/km$^1$/ | %$^2$ | Particulates g/km$^1$/ | %$^2$ |
|---|---|---|---|---|---|---|---|---|
| ECE | None | | 0.95 | — | 3.05 | — | 0.236 | — |
| | C-5 | 5.0 | 0.71 | 25 | 3.05 | 0 | 0.088 | 62.7 |
| | C-6 | 10.0 | 0.67 | 29 | 3.05 | 0 | 0.069 | 70.8 |
| | E-4 | 2.5 | 0.18 | 81 | 3.05 | 0 | 0.083 | 64.8 |
| | E-5 | 10.0 | 0.19 | 80 | 3.05 | 0 | 0.068 | 71.2 |
| | C-7 | 40.0+ | 0.46 | 52 | 2.59 | 15.1 | 0.082 | 65.3 |
| EUDC | None | | 0.13 | — | 0.44 | — | 0.114 | — |
| | C-5 | 5.0 | 0.09 | 30.8 | 0.30 | 32 | 0.065 | 43 |
| | C-6 | 10.0 | 0.09 | 30.8 | 0.30 | 32 | 0.048 | 57.9 |
| | E-4 | 2.5 | 0.104 | 20.0 | 0.41 | 7 | 0.06 | 47.4 |
| | E-5 | 10.0 | 0.061 | 53.1 | 0.16 | 64 | 0.05 | 56.1 |
| | C-7 | 40.0+ | 0.017 | 86.9 | 0.02 | 95 | 0.088 | 22.8 |
| CYCLE "A" | None | | 0.428 | — | 1.4 | — | 0.148 | — |
| | C-5 | 5.0 | 0.320 | 25.2 | 1.3 | 7.1 | 0.073 | 50.7 |
| | C-6 | 10.0 | 0.300 | 29.9 | 1.3 | 7.1 | 0.056 | 62.2 |
| | E-4 | 2.5 | 0.132 | 69.2 | 1.37 | 2.1 | 0.068 | 54.1 |
| | E-5 | 10.0 | 0.107 | 75.0 | 1.21 | 13.6 | 0.057 | 61.5 |
| | C-7 | 40.0+ | 0.178 | 58.4 | 0.96 | 31.4 | 0.085 | 42.6 |

$^1$Emissions in exhaust.
$^2$Percent of emissions converted to innocuous substances by catalytic treatment.

TABLE II-B

Test Results for Mercedes Benz 200D Diesel Automobile

| Test Part | Cata-lyst | Pt Load. g/ft$^3$ | Hydrocarbons g/km$^1$/ | %$^2$ | Carbon Monoxide g/km$^1$/ | %$^2$ | Particulates g/km$^1$/ | %$^2$ |
|---|---|---|---|---|---|---|---|---|
| ECE | None | | 0.07 | — | 0.9 | — | 0.125 | — |
| | C-X | 2.0 | 0.07 | 0 | 0.88 | 2.2 | 0.09 | 28 |
| | C-5 | 5.0 | 0.07 | 0 | 0.86 | 4.4 | 0.09 | 28 |
| | C-6 | 10.0 | 0.065 | 7.1 | 0.75 | 17 | 0.09 | 28 |
| | E-4 | 2.5 | 0.008 | 89 | 0.9 | 0 | 0.095 | 24 |
| | E-5 | 10.0 | 0.006 | 91 | 0.8 | 11 | 0.095 | 24 |
| EUDC | None | | 0.031 | — | 0.31 | — | 0.097 | — |
| | C-X | 2.0 | 0.02 | 35 | 0.17 | 45 | 0.071 | 27 |
| | C-5 | 5.0 | 0.006 | 81 | 0.1 | 68 | 0.06 | 38 |
| | C-6 | 10.0 | 0.006 | 81 | 0.08 | 74 | 0.064 | 34 |
| | E-4 | 2.5 | 0.017 | 45 | 0.21 | 32 | 0.064 | 34 |
| | E-5 | 10.0 | 0.004 | 87 | 0.1 | 68 | 0.07 | 28 |
| CYCLE "A" | None | | 0.045 | — | 0.52 | — | 0.107 | — |
| | C-X | 2.0 | 0.038 | 16 | 0.43 | 17 | 0.078 | 27 |
| | C-5 | 5.0 | 0.029 | 36 | 0.33 | 37 | 0.071 | 34 |
| | C-6 | 10.0 | 0.027 | 40 | 0.32 | 38 | 0.073 | 32 |
| | E-4 | 2.5 | 0.014 | 69 | 0.46 | 12 | 0.075 | 30 |
| | E-5 | 10.0 | 0.005 | 89 | 0.35 | 33 | 0.078 | 27 |

$^1$Emissions in exhaust.
$^2$Percent of emissions converted to innocuous substances by catalytic treatment.

From the data in the foregoing TABLES II-A and II-B it can be seen that samples E-4 and E-5 according to the present invention gave higher gas-phase hydrocarbon conversion (about 80%) in the ECE part of the test for the Audi 100 automobile than comparative catalysts C-5, C-6 having comparable platinum loadings but without Fe-Beta zeolite, and without significant gain in SO$_{O2}$ oxidation. Further, catalysts E-4 and E-5 according to the present invention gave better hydrocarbon conversion performance than the commercial catalyst C-7, which has a much higher platinum loading.

In the hotter EUDC part of the test, on the Audi 100 automobile, catalyst samples of the present invention (E-4, E-5) exhibited superior particulates removal compared to the comparative commercial catalyst C-7, as did the comparative catalysts C-5 and C-6. This is probably due to the high degree of $SO_2$ oxidation caused by the high platinum loading of the commercial catalyst, the resulting sulfate make adding to the mass of the particulates. Overall, the catalysts according to the present invention (E-4, E-5) gave better gas-phase hydrocarbon conversion and particulates removal than the comparative commercial catalyst (C-7) and the comparative catalysts (C-5, C-6).

The overall performance of the catalysts for Cycle A was slightly better than the comparative samples.

The results for the ECE portion of the tests on the Mercedes Benz automobile also show that catalysts according to the invention (E-4, E-5) had superior low temperature gas-phase hydrocarbon conversion while maintaining acceptable particulates conversion. It is noted that all the catalysts except E-4 exhibited significant improvement in CO conversion, in comparison to the Audi 100 test. The improvement is attributed to the difference in exhaust temperature between the respective vehicles (on average 10° C. higher for Mercedes than for Audi), highlighting the temperature sensitivity of CO conversion activity. The overall Cycle A results for the catalysts of the invention are substantially better than the comparative samples due to the better overall hydrocarbon conversion with comparable CO and particulates conversion. The better total particulates conversion rates exhibited for the Audi automobile relative to the Mercedes automobile can be attributed to the lower VOF content of the Mercedes exhaust as compared to the Audi exhaust.

EXAMPLE 4

Examples of Ceria-Alumina With Pt-Beta Zeolite and Pt-Fe-Beta Zeolite

A. Platinum ion-exchanged Beta zeolite was prepared by stirring 100 grams of Beta zeolite powder into a water solution containing 0.85 grams tetraammine platinum [II] chloride in 500 ml water. The resulting slurry was stirred and allowed to stand for 24 hours, and then filtered, washed with 1 liter of water, dried overnight at 100° C. and calcined at 540° C. for 2 hours. The resulting Pt-Beta zeolite material contained 0.48% platinum by weight.

A catalyst slurry was prepared comprising 33% by weight (dry basis) of the Pt-Beta zeolite and 67% (dry basis) of a mixture of equal parts by weight of ceria having a surface area of 143 m$^2$/g and γ-alumina having a surface area of 150 m$^2$/g. The slurry was coated onto a honeycomb carrier to provide a loading of 2 g/in$^3$ using 10% by weight additional γ-alumina as a binder. The coated honeycomb was exposed to a gaseous mixture of 10% steam in air at 400° C. for 4 hours. This catalyst contained 10 g/ft$^3$ Pt and was designated E-6.

B. Beta zeolite was ion-exchanged with iron and then with platinum as generally described in Example B to yield a Beta zeolite comprising 1.65% by weight iron and 0.5% by weight platinum. The resulting Pt-Fe-Beta zeolite material was made into a slurry comprising 33% by weight (dry basis) Pt-Fe-Beta zeolite and 67% (dry basis) of a mixture of equal parts by weight of ceria having a surface area of 143 m$^2$/g and γ-alumina having a surface area of 150 m$^2$/g. The slurry was coated onto a honeycomb carrier at a loading of 2 g/in$^3$ using additional alumina as a binder. This catalyst contained 10 g/ft$^3$ Pt and was designated E-7.

C. Catalysts E-6 and E-7 were tested in a diagnostic reactor through which a test stream identical to that described in part C. of Example 2 was passed. The heptane, carbon monoxide and $SO_2$ conversion rates were noted at the inlet temperatures of the test stream set forth below in TABLE III, in which the results are tabulated.

TABLE III

| | Conversion | | | | | | | | | | | |
|---|---|---|---|---|---|---|---|---|---|---|---|---|
| | % Heptane at ° C. | | | | % CO at ° C. | | | | % $SO_2$ at ° C. | | | |
| Cat. | 150 | 200 | 275 | 350 | 150 | 200 | 275 | 350 | 150 | 200 | 275 | 350 |
| E-6 | 3.3 | 3.5 | 13 | 93 | 1.5 | 7 | 97 | 100 | 2.6 | 0 | 25 | 52 |
| E-7 | 4.0 | 2.0 | 8.6 | 88 | 0 | 43 | 100 | 100 | 9.0 | 2 | 18 | 53 |

The data of TABLE III show both catalysts E-6 and E-7 were effective for the conversion of heptane and carbon monoxide, and that sample E-7 exhibits superior carbon monoxide conversion at 200° C. and above relative to sample E-6, while providing comparable performance with respect to heptane conversion and $SO_2$ oxidation.

Lube Oil Combustion Test and Test Results

In many diesel engines the VOF in the diesel exhaust consists mainly of diesel lube oil which has been swept from the cylinder walls and comes through valve guides and turbocharger seals. A laboratory test was used to evaluate the relative performance of the catalyst powders of Example 5 below for burning diesel lube oil, as a model of the ability of the corresponding catalyst to catalyze the oxidation of the VOF in diesel engine exhaust. This test allows for the relative ranking of catalyst materials for their effectiveness of burning lube oil via the interactions between the catalyst and lube oil as they are heated together in air.

Thus, a catalyst powder sample is mixed uniformly with a measured amount of lube oil. The mixture of catalyst and lube oil (about 10–30 mg) is placed into the quartz sample pan of a simultaneous TGA/DTA instrument (Thermal Sciences STA 1500) and heated in flowing air using a standard heating ramp (20° C./min.) from ambient temperature to 1000° C.

The collected data, cumulative weight loss (TGA) and heat evolution (DTA) as a function of temperature, are normalized for the weight of catalyst sample and the amount of lube oil present. The total weight loss (TGA) measured is made up of water loss which occurs at about 100° C. or less and lube oil loss either by volatilization or by combustion. The water loss occurs in a discrete step and can be thus differentiated from the lube oil losses. The exotherm (DTA Peak) is a measure of the lube oil loss due to combustion of the lube oil. These data are used to calculate a DTA Peak Area (uv-sec/mg-catalyst sample/mg-lube oil) which is used as the key measure of the catalyst's ability to catalyze the combustion of VOF (lube oil) in this test. Tests have been conducted in which catalyst powders were used to catalyze the combustion of lubricating oil and the same catalytic powders were used to prepare catalysts supported on a substrate. Tests of such catalysts on diesel engine exhausts showed good correlation between the performance of the catalyst powder in the laboratory TGA and DTA tests and the performance of the corresponding catalyst in the engine test.

EXAMPLE 5

TGA/DTA Lube Oil Combustion Test

FCC Cat (Ceria/Zeolite)

A. A catalyst material according to the present invention designated E-8 comprised a mixture of 50% by weight bulk ceria having a BET surface area of 143 $m^2$/g and 50% by weight ZSM-5 H-zeolite by weight of the mixture. The catalyst was prepared by mixing the ceria and ZSM-5 powders, drying overnight at 100° C. and calcining at 450° C. for three hours. The catalyst material was wetted with a quantity of Cummins SAE 15 W/40 Premium blue diesel engine lube oil equal to 4% of the weight of the zeolite, and was then placed in a TGA/DTA analyzer. The results are set forth in the attached FIG. 10.

B. A series of seven other catalyst materials was prepared as generally described in Part A above, and were designated E-9 through E-15, respectively. The first three of these, E-9, E-10 and E-11, comprised mixtures of ceria having a surface area of 143 $m^2$/g on which platinum had been dispersed by the incipient wetness method to provide 0.5 percent platinum thereon by weight of ceria plus platinum (Pt/Ceria) with H-Mordenite, Fe-Beta zeolite and H-ZSM-5, respectively. In each case, equal weights of Pt/ceria and zeolite were used. Samples E-12, E-13, E-14 and E-15 all comprised mixtures of zeolites, ceria and alumina, in which mixtures of equal weights of ceria plus alumina comprised 67% of the weight of the catalytic material, the zeolite (including doped metals) accounting for 33% by weight of the catalytic material. In these samples, the zeolites were doped by ion-exchange with 0.6 percent platinum by weight of the zeolite. The zeolites in these examples were Pt-ZSM-5, Pt-Y-zeolite, Pt-Fe-Beta zeolite and Pt-H-Beta zeolite, respectively.

The ability of each of these sample materials to catalyze the combustion of the lube oil was tested using thermogravimetric analysis and differential temperature analysis (TGA/DTA) techniques. In TGA/DTA studies, the heat absorbed or released and the weight lost by a sample as a function of temperature are recorded simultaneously and can be used to evaluate the capability of the material to catalyze the combustion of the lube oil. Since, as discussed above, lube oil constitutes a significant portion of the VOF particulates in diesel engine exhaust, the results of the TGA/DTA study of lube oil-doped material reflects the ability of the material to combust the VOF particulates. The amount of lube oil added to the material (10% by weight) is far in excess of the amount of VOF hydrocarbons that a diesel catalyst would ordinarily be exposed to in the time frame of this test, but this quantity is used so that reproducible results may be obtained from this test. Each oil-wetted sample was placed in a quartz pan sample holder located inside an STA/1500 Simultaneous Thermoanalyzer and heated in air at a rate of 20° C./min. from room temperature to 1000° C. The sample weights varied between 30 and 10 milligrams. For comparison, a like quantity of lube oil was placed in the analysis chamber so that the TGA/DTA curves could be corrected for water loss and vaporization.

Figure 10:
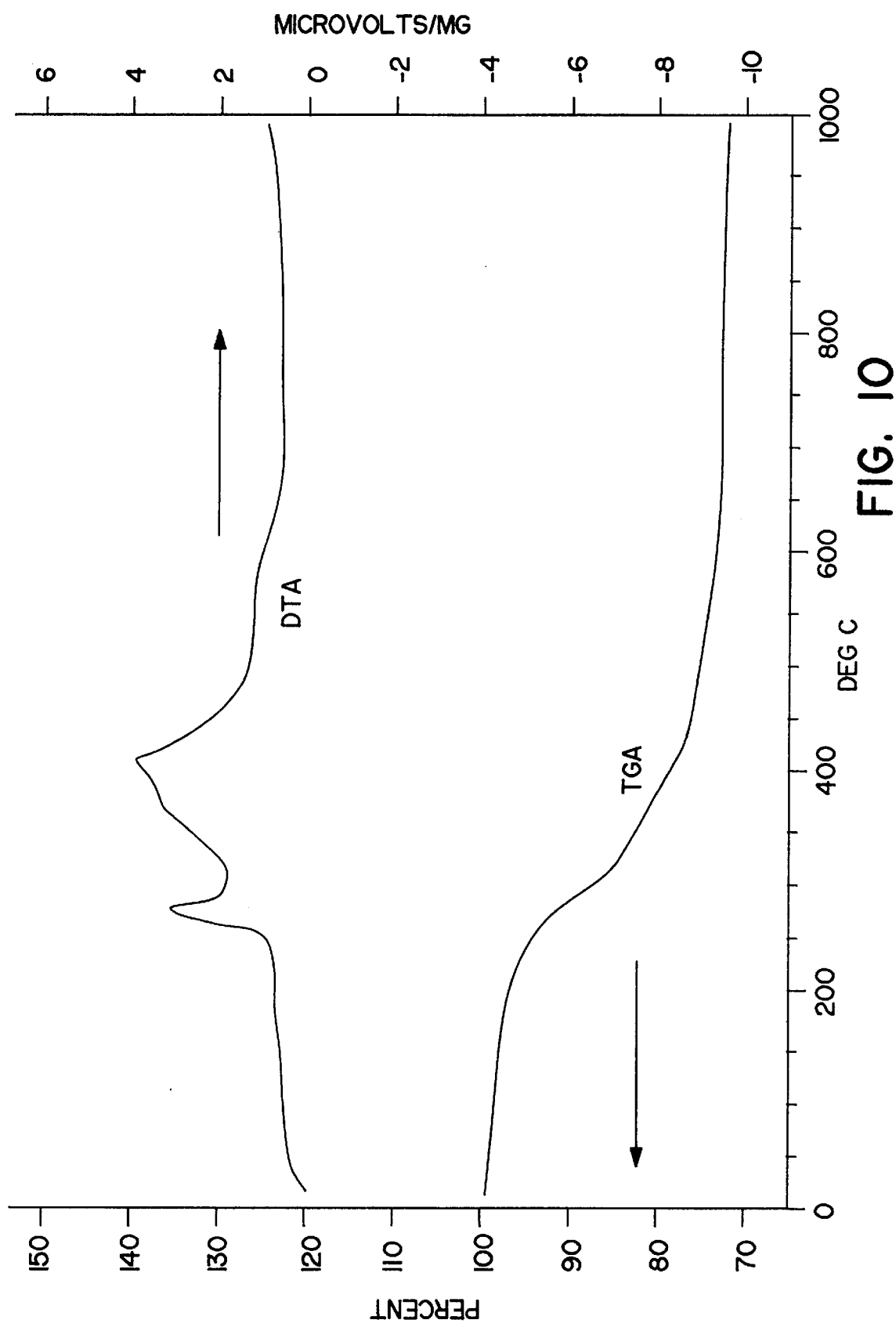
FIG. 10 is an exemplary TGA/DTA plot of sample E-8 of Example 5.

In FIG. 10, the ordinate on the left-hand side of the Figure relates to the lower curve and shows changes in the weight of the sample of oil-wetted material relative to temperature. The ordinate on the right-hand side of the Figure relates to the upper curve and shows the heat released from the sample per milligram of sample (catalyst plus lube oil) at various temperatures. The quantity of heat is measured by a thermocouple and is expressed in microvolts per milligram of catalyst plus lube oil. The distinct rise in heat release at about 200° C. indicates the commencement of catalytic oxidation of the wetted oil, as does the loss in weight of the sample. One indication of the catalytic activity of the test material is the area under the DTA plot, referred to in TABLE IV as the DTA area. The DTA area is obtained by integrating the area under the curve and dividing by the lube oil weight loss as measured by TGA. The units are thus measured in microvolt-seconds (generated by a thermocouple in response to the temperature change) per milligram of catalyst sample per milligram of lube oil. The units are abbreviated as "uv-s/mg/mg" in TABLE IV. Generally, the more catalytically active the material, the greater is the DTA area: that is, the greater is the heat release generated by combustion of the lube oil as compared to the total amount of normalized lube oil loss (resulting from combustion plus volatilization). The following TABLE IV shows the DTA area for all the samples tested in this example.

TABLE IV

| Sample (Percents By Weight) | | DTA Area uv-s/mg/mg |
|---|---|---|
| E-8 | (50% $CeO_2$ plus 50% ZSM-5) | 5,856 |
| E-9 | (50% Pt/$CeO_2$ plus 50% H-Mordenite) | 10,100 |
| E-10 | (50% Pt/$CeO_2$ plus 50% Fe-Beta Z) | 14,800 |
| E-11 | (50% Pt/$CeO_2$ plus 50% H-ZSM-5) | 16,700 |
| E-12 | (67% [$AlO_3$/$CeO_2$]* plus 33% Pt-ZSM-5) | 12,975 |
| E-13 | (67% [$AlO_3$/$CeO_2$]* plus 33% Pt-Y-Z) | 6,990 |
| E-14 | (67% [$AlO_3$/$CeO_2$]* plus 33% Pt-Fe-Beta Z) | 10,200 |
| E-15 | (67% [$AlO_3$/$CeO_2$]* plus 33% Pt-H-Beta Z) | 10,630 |

*50% $Al_2O_3$ plus 50% $CeO_2$

The data of TABLE IV show that a variety of zeolites can be combined with ceria or ceria and alumina to yield materials that are catalytically active for the combustion of lube oil. Such catalytic activity, as discussed above, is indicative of the ability to reduce the VOF content of diesel exhaust.

While the invention has been described in detail with respect to specific preferred embodiments thereof it will be appreciated that variations thereto may be made which nonetheless lie within the scope of the invention and the appended claims.

What is claimed is:

1. A method for treating a diesel engine exhaust stream comprising hydrocarbons selected from the group consisting of gaseous hydrocarbons and hydrocarbons present in a volatile organic fraction comprising the steps of:

contacting the stream with a catalyst composition comprising ceria having a BET surface area of at least about 10 $m^2$/g, iron-doped Beta zeolite, and at least one catalytic metal selected from the group consisting of platinum and palladium;

adsorbing at least some of the hydrocarbons on the catalyst;

increasing the temperature of the exhaust gas and desorbing the hydrocarbons from the catalyst; and catalyzing the oxidation of at least some of the hydrocarbons.

2. The method of claim 1 wherein the catalyst composition further comprises of alumina having a BET surface area of at least about 10 m$^2$/g.

3. The method of claim 1 or claim 2 wherein the refractory carrier has a plurality of parallel exhaust flow passages extending therethrough and defined by passage walls on which the catalytic material is coated, and the catalytic material comprises platinum and is present in a quantity sufficient to provide about 5 to 60 g/ft$^3$ of platinum.

4. The method of claim 2 wherein the zeolite is disposed in a discrete layer which is overlain by one or more discrete layers containing the alumina and the ceria.

5. The method of claim 2 wherein the refractory carrier has a plurality of parallel exhaust stream flow passages extending therethrough and defined by passage walls on which the catalyst material is coated, and the catalyst material comprises dispersed platinum carried thereon in an amount of from about 0.1 to 60 g/ft$^3$.

6. The method of claim 5 wherein the dispersed platinum is present in the amount of from about 0.1 to 5 g/ft$^3$.

7. The method of claim 5 wherein at least a catalytically effective amount of the dispersed platinum is carried on the ceria.

8. The method of claim 1 or claim 2 wherein the temperature of the exhaust stream initially contacted with the catalyst composition is from about 100° C. to 800° C.

9. The method of claim 1 or claim 2 wherein the refractory carrier has a plurality of parallel exhaust stream flow passages extending therethrough and defined by passage walls on which the catalytic material is coated, and the catalytic material further comprises dispersed palladium carried thereon in the amount of from about 0.1 to 200 g/ft$^3$.

10. The method of claim 1 wherein the zeolite comprises a three-dimensional zeolite characterized by pore openings whose smallest cross-sectional dimension is at least about 5 Angstroms and having a silicon to aluminum atomic ratio of greater than 5.

11. The method of claim 1 wherein the zeolite is doped with platinum or palladium.

12. The method of claims 10, claim 1 or claim 11 wherein the catalyst composition comprises bulk alumina having a BET surface area of at least about 10 m$^2$/g.

13. The method of claim 12 wherein the zeolite comprises from about 10 to 90 percent by weight, the alumina comprises from about 60 to 5 percent by weight, and the ceria comprises from about 60 to 5 percent by weight, of the combined weight of the zeolite, the alumina and the ceria.

14. The method of claim 12 wherein the ceria and the alumina each has a BET surface area of from about 25 m$^2$/g to 200 m$^2$/g.

15. The method of claim 1 where the hydrocarbons comprise the gaseous hydrocarbons and the hydrocarbons present in the volatile organic fraction.

16. The method of claim 1 wherein the hydrocarbons present in the volatile organic fraction are adsorbed at from at least about 121° up to about 217° C.

17. The method of claim 1 where the gaseous hydrocarbons are desorbed at from about 121° C. to about 217° C.

18. The method of claim 1 where the gaseous hydrocarbons are oxidized at from about 217° C. to about 557° C.

19. The method of claim 1 wherein the hydrocarbons are gaseous hydrocarbons.

20. The method of claim 1 wherein the hydrocarbons are hydrocarbons present in the volatile organic fraction.

21. The method of claim 1 wherein at least one catalytic metal selected from the group consisting of from about 0.1 to 60 g/ft$^3$ platinum and from about 0.1 to 200 g/ft$^3$ palladium is dispersed on the ceria, and wherein the composition contains from 5 to 50 g/ft$^3$ of iron and wherein the zeolite constitutes from 10 to 90 percent by weight of the zeolite plus the ceria.

22. The method of claim 21 wherein the catalyst composition comprises alumina.

23. The method of claim 22 wherein at least one catalytic metal selected from the group consisting of platinum and palladium is dispersed on the alumina.

24. The method of claim 22 wherein at least one catalytic metal selected from the group consisting of platinum and palladium is dispersed on the ceria and on the alumina.

25. The method of claim 21 wherein at least one catalytic metal selected from the group consisting of platinum and palladium is dispersed on the iron doped Beta zeolite.

26. A method for treating a diesel engine exhaust stream comprising hydrocarbons selected from the group consisting of gaseous hydrocarbons and hydrocarbons present in a volatile organic fraction comprising the step of contacting the stream with a catalyst composition consisting essentially of ceria having a BET surface area of at least about 10 m$^2$/g, iron-doped Beta zeolite and, optionally, at least one catalytic metal selected from the group consisting of platinum and palladium.

27. The method of claim 26 wherein at least one catalytic metal moiety selected from the group consisting of from about 0.1 to 60 g/ft$^3$ platinum and from about 0.1 to 200 g/ft$^3$ palladium is dispersed on the ceria and wherein the zeolite constitutes from about 10 to 90 weight percent of the ceria plus zeolite.

28. The method of claim 26 wherein the zeolite is characterized by pore openings whose smallest cross-sectional diameter is at least about five Angstroms.

* * * * *